United States Patent
Kovalev et al.

(10) Patent No.: US 12,107,238 B2
(45) Date of Patent: Oct. 1, 2024

(54) ELECTROLYTES FOR REDUCED GASSING

(71) Applicant: Sion Power Corporation, Tucson, AZ (US)

(72) Inventors: Igor P. Kovalev, Vail, AZ (US); Alexis Sheffield, Tucson, AZ (US); Yuriy V. Mikhaylik, Tucson, AZ (US)

(73) Assignee: Sion Power Corporation, Tucson, AZ (US)

( * ) Notice: Subject to any disclaimer, the term of this patent is extended or adjusted under 35 U.S.C. 154(b) by 303 days.

(21) Appl. No.: 17/479,299

(22) Filed: Sep. 20, 2021

(65) Prior Publication Data

US 2022/0115715 A1  Apr. 14, 2022

Related U.S. Application Data

(60) Provisional application No. 63/091,496, filed on Oct. 14, 2020.

(51) Int. Cl.
| | |
|---|---|
| *H01M 10/42* | (2006.01) |
| *H01M 10/0525* | (2010.01) |
| *H01M 10/0567* | (2010.01) |
| *H01M 10/0568* | (2010.01) |
| *H01M 10/0569* | (2010.01) |

(52) U.S. Cl.
CPC ........... *H01M 10/4235* (2013.01); *H01M 10/0525* (2013.01); *H01M 10/0567* (2013.01); *H01M 10/0568* (2013.01); *H01M 10/0569* (2013.01)

(58) Field of Classification Search
None
See application file for complete search history.

(56) References Cited

U.S. PATENT DOCUMENTS

| | | | |
|---|---|---|---|
| 5,648,187 A | 7/1997 | Skotheim | |
| 5,919,587 A | 7/1999 | Mukherjee et al. | |
| 5,961,672 A | 10/1999 | Skotheim et al. | |
| 6,238,821 B1 | 5/2001 | Mukherjee et al. | |
| 6,733,924 B1 | 5/2004 | Skotheim et al. | |
| 6,797,428 B1 | 9/2004 | Skotheim et al. | |
| 6,936,381 B2 | 8/2005 | Skotheim et al. | |
| 7,247,408 B2 | 7/2007 | Skotheim et al. | |
| 7,688,075 B2 | 3/2010 | Kelley et al. | |
| 7,771,870 B2 | 8/2010 | Affinito et al. | |
| 7,785,730 B2 | 8/2010 | Affinito et al. | |
| 7,939,198 B2 | 5/2011 | Mukherjee et al. | |

(Continued)

FOREIGN PATENT DOCUMENTS

| | | |
|---|---|---|
| CN | 107573371 A | 1/2018 |
| JP | 2009-054287 A | 3/2009 |
| KR | 2004-0107549 A | 12/2004 |

OTHER PUBLICATIONS

Bauer et al., A Study of methylenedisulfonic acid and its derivatives. J Pharm Sci. Jun. 1, 1937;26(6):485-93.

(Continued)

*Primary Examiner* — Eli S Mekhlin
(74) *Attorney, Agent, or Firm* — Wolf, Greenfield & Sacks, P.C.

(57) ABSTRACT

Electrolytes, articles, and methods for reducing gases produced during the operation of an electrochemical cell are generally described. The inclusion of silylated sulfonic acid esters can reduce the amount of gases produced in an electrochemical cell (e.g., a battery).

15 Claims, 6 Drawing Sheets

(56) References Cited

U.S. PATENT DOCUMENTS

| | | | |
|---|---|---|---|
| 8,076,024 B2 | 12/2011 | Affinito et al. |
| 8,084,102 B2 | 12/2011 | Affinito |
| 8,087,309 B2 | 1/2012 | Kelley et al. |
| 8,105,717 B2 | 1/2012 | Skotheim et al. |
| 8,197,971 B2 | 6/2012 | Skotheim et al. |
| 8,264,205 B2 | 9/2012 | Kopera |
| 8,338,034 B2 | 12/2012 | Affinito et al. |
| 8,404,389 B2 | 3/2013 | Ihara et al. |
| 8,415,054 B2 | 4/2013 | Skotheim et al. |
| 8,603,680 B2 | 12/2013 | Affinito et al. |
| 8,617,748 B2 | 12/2013 | Mikhaylik et al. |
| 8,623,557 B2 | 1/2014 | Skotheim et al. |
| 8,728,661 B2 | 5/2014 | Skotheim et al. |
| 8,753,771 B2 | 6/2014 | Skotheim et al. |
| 8,871,387 B2 | 10/2014 | Wang et al. |
| 8,936,870 B2 | 1/2015 | Affinito et al. |
| 8,968,928 B2 | 3/2015 | Wang et al. |
| 9,005,311 B2 | 4/2015 | Safont-Sempere et al. |
| 9,005,809 B2 | 4/2015 | Wilkening et al. |
| 9,034,421 B2 | 5/2015 | Mikhaylik et al. |
| 9,040,197 B2 | 5/2015 | Affinito et al. |
| 9,040,201 B2 | 5/2015 | Affinito et al. |
| 9,065,149 B2 | 6/2015 | Skotheim et al. |
| 9,077,041 B2 | 7/2015 | Burnside et al. |
| 9,105,938 B2 | 8/2015 | Scordilis-Kelley et al. |
| 9,214,678 B2 | 12/2015 | Mikhaylik |
| 9,397,342 B2 | 7/2016 | Skotheim et al. |
| 9,419,274 B2 | 8/2016 | Wilkening et al. |
| 9,490,478 B2 | 11/2016 | Mikhaylik et al. |
| 9,531,009 B2 | 12/2016 | Kumaresan et al. |
| 9,548,492 B2 | 1/2017 | Affinito et al. |
| 9,559,348 B2 | 1/2017 | Kumaresan et al. |
| 9,577,243 B2 | 2/2017 | Schmidt et al. |
| 9,577,267 B2 | 2/2017 | Scordilis-Kelley et al. |
| 9,653,735 B2 | 5/2017 | Skotheim et al. |
| 9,653,750 B2 | 5/2017 | Laramie et al. |
| 9,711,784 B2 | 7/2017 | Kelley et al. |
| 9,728,768 B2 | 8/2017 | Mikhaylik et al. |
| 9,735,411 B2 | 8/2017 | Viner et al. |
| 9,755,268 B2 | 9/2017 | Fleischmann et al. |
| 9,780,404 B2 | 10/2017 | Scordilis-Kelley et al. |
| 9,825,328 B2 | 11/2017 | Du et al. |
| 9,853,287 B2 | 12/2017 | Mikhaylik et al. |
| 9,947,963 B2 | 4/2018 | Du et al. |
| 9,994,959 B2 | 6/2018 | Laramie et al. |
| 9,994,960 B2 | 6/2018 | Laramie et al. |
| 10,020,479 B2 | 7/2018 | Mikhaylik et al. |
| 10,020,512 B2 | 7/2018 | Gronwald et al. |
| 10,050,308 B2 | 8/2018 | Liao et al. |
| 10,069,135 B2 | 9/2018 | Fleischmann et al. |
| 10,069,146 B2 | 9/2018 | Skotheim et al. |
| 10,122,043 B2 | 11/2018 | Du et al. |
| 10,243,202 B2 | 3/2019 | Fleischmann et al. |
| 10,312,545 B2 | 6/2019 | Scordilis-Kelley et al. |
| 10,319,988 B2 | 6/2019 | Kelley et al. |
| 10,320,027 B2 | 6/2019 | Scordilis-Kelley et al. |
| 10,320,031 B2 | 6/2019 | Mikhaylik et al. |
| 10,333,134 B2 | 6/2019 | Mikhaylik et al. |
| 10,333,149 B2 | 6/2019 | Affinito et al. |
| 10,388,987 B2 | 8/2019 | Du et al. |
| 10,461,333 B2 | 10/2019 | Mikhaylik et al. |
| 10,461,372 B2 | 10/2019 | Laramie et al. |
| 10,490,796 B2 | 11/2019 | Laramie et al. |
| 10,535,902 B2 | 1/2020 | Laramie et al. |
| 10,541,448 B2 | 1/2020 | Mikhaylik et al. |
| 10,553,893 B2 | 2/2020 | Laramie et al. |
| 10,573,869 B2 | 2/2020 | Mikhaylik et al. |
| 10,608,278 B2 | 3/2020 | Liao et al. |
| 10,629,947 B2 | 4/2020 | Affinito et al. |
| 10,629,954 B2 | 4/2020 | Mikhaylik et al. |
| 10,720,648 B2 | 7/2020 | Quero-Mieres et al. |
| 10,847,833 B2 | 11/2020 | Bunte et al. |
| 10,862,105 B2 | 12/2020 | Gronwald et al. |
| 10,868,306 B2 | 12/2020 | Mudalige et al. |
| 10,879,527 B2 | 12/2020 | Laramie et al. |
| 10,944,094 B2 | 3/2021 | Liao et al. |
| 10,965,130 B2 | 3/2021 | Mikhaylik et al. |
| 10,991,925 B2 | 4/2021 | Wang et al. |
| 11,038,178 B2 | 6/2021 | Liao et al. |
| 11,041,248 B2 | 6/2021 | Laramie et al. |
| 11,056,728 B2 | 7/2021 | Mikhaylik et al. |
| 11,088,395 B2 | 8/2021 | Mikhaylik et al. |
| 11,108,076 B2 | 8/2021 | Scordilis-Kelley et al. |
| 11,108,077 B2 | 8/2021 | Scordilis-Kelley et al. |
| 11,121,397 B2 | 9/2021 | Scordilis-Kelley et al. |
| 11,165,122 B2 | 11/2021 | Laramie et al. |
| 11,183,690 B2 | 11/2021 | Wang et al. |
| 2002/0197537 A1* | 12/2002 | Kim ............... H01M 10/0567 429/340 |
| 2005/0196672 A1 | 9/2005 | Mukherjee et al. |
| 2006/0115579 A1 | 6/2006 | Mukherjee et al. |
| 2007/0221265 A1 | 9/2007 | Affinito et al. |
| 2008/0318128 A1 | 12/2008 | Simoneau et al. |
| 2009/0035646 A1 | 2/2009 | Mikhaylik et al. |
| 2009/0055110 A1 | 2/2009 | Kelley et al. |
| 2010/0239914 A1 | 9/2010 | Mikhaylik et al. |
| 2011/0006738 A1 | 1/2011 | Mikhaylik et al. |
| 2011/0014524 A1 | 1/2011 | Skotheim et al. |
| 2011/0068001 A1 | 3/2011 | Affinito et al. |
| 2011/0070491 A1 | 3/2011 | Campbell et al. |
| 2011/0070494 A1 | 3/2011 | Campbell et al. |
| 2011/0076560 A1 | 3/2011 | Scordilis-Kelley et al. |
| 2011/0159376 A1 | 6/2011 | Skotheim et al. |
| 2011/0165471 A9 | 7/2011 | Skotheim et al. |
| 2011/0206992 A1 | 8/2011 | Campbell et al. |
| 2011/0256450 A1 | 10/2011 | Campbell et al. |
| 2012/0048729 A1 | 3/2012 | Mikhaylik et al. |
| 2012/0052339 A1 | 3/2012 | Mikhaylik et al. |
| 2012/0070746 A1 | 3/2012 | Mikhaylik et al. |
| 2012/0082872 A1 | 4/2012 | Schmidt et al. |
| 2012/0082901 A1 | 4/2012 | Schmidt et al. |
| 2013/0316072 A1 | 11/2013 | Scordilis-Kelley et al. |
| 2014/0199601 A1 | 7/2014 | Onozuka et al. |
| 2014/0272594 A1 | 9/2014 | Safont Sempere et al. |
| 2014/0272595 A1 | 9/2014 | Cristadoro et al. |
| 2015/0162586 A1 | 6/2015 | Fleischmann et al. |
| 2015/0188194 A1 | 7/2015 | Mikhaylik et al. |
| 2015/0200423 A1 | 7/2015 | Mita et al. |
| 2015/0287986 A1 | 10/2015 | Affinito et al. |
| 2016/0118638 A1 | 4/2016 | Gronwald et al. |
| 2016/0118651 A1 | 4/2016 | Kovalev et al. |
| 2017/0141385 A1 | 5/2017 | Scordilis-Kelley et al. |
| 2017/0141402 A1 | 5/2017 | Affinito et al. |
| 2018/0006303 A1 | 1/2018 | Mikhaylik et al. |
| 2018/0254516 A1 | 9/2018 | Han et al. |
| 2018/0261820 A1 | 9/2018 | Liao et al. |
| 2018/0301697 A1 | 10/2018 | Affinito et al. |
| 2018/0351148 A1 | 12/2018 | Schneider et al. |
| 2018/0375155 A1 | 12/2018 | Liao et al. |
| 2019/0006699 A1 | 1/2019 | Jones et al. |
| 2019/0088958 A1 | 3/2019 | Viner et al. |
| 2019/0229323 A1 | 7/2019 | Mikhaylik et al. |
| 2019/0267632 A1 | 8/2019 | Affinito et al. |
| 2019/0348672 A1 | 11/2019 | Wang et al. |
| 2020/0044460 A1 | 2/2020 | Mikhaylik et al. |
| 2020/0099108 A1 | 3/2020 | Laramie et al. |
| 2020/0185764 A1 | 6/2020 | Liao et al. |
| 2020/0194822 A1 | 6/2020 | Laramie et al. |
| 2020/0220146 A1 | 7/2020 | Laramie et al. |
| 2020/0220149 A1 | 7/2020 | Laramie et al. |
| 2020/0220197 A1 | 7/2020 | Laramie et al. |
| 2020/0220205 A1 | 7/2020 | Affinito et al. |
| 2020/0350631 A1 | 11/2020 | Mikhaylik et al. |
| 2020/0373551 A1 | 11/2020 | Milobar et al. |
| 2020/0373578 A1 | 11/2020 | Wang et al. |
| 2020/0373616 A1* | 11/2020 | Choi ............... H01M 10/0525 |
| 2020/0373617 A1 | 11/2020 | Kim et al. |
| 2020/0395585 A1 | 12/2020 | Laramie et al. |
| 2021/0057753 A1 | 2/2021 | Viner et al. |
| 2021/0135192 A1 | 5/2021 | Gronwald et al. |
| 2021/0135205 A1 | 5/2021 | Laramie et al. |
| 2021/0135297 A1 | 5/2021 | Mikhaylik et al. |
| 2021/0138673 A1 | 5/2021 | Shannon et al. |
| 2021/0151815 A1 | 5/2021 | Milobar et al. |

(56) References Cited

U.S. PATENT DOCUMENTS

| | | |
|---|---|---|
| 2021/0151817 A1 | 5/2021 | Jennings et al. |
| 2021/0151830 A1 | 5/2021 | Shayan et al. |
| 2021/0151839 A1 | 5/2021 | Niedzwiecki et al. |
| 2021/0193984 A1 | 6/2021 | Laramie et al. |
| 2021/0193985 A1 | 6/2021 | Laramie et al. |
| 2021/0193996 A1 | 6/2021 | Laramie et al. |
| 2021/0194069 A1 | 6/2021 | Hamblin et al. |
| 2021/0218243 A1 | 7/2021 | Hamblin et al. |
| 2021/0249651 A1 | 8/2021 | Laramie et al. |
| 2021/0265610 A1 | 8/2021 | Liao et al. |
| 2021/0328274 A1 | 10/2021 | Mikhaylik et al. |

OTHER PUBLICATIONS

Kessler et al., Synthesis of N'-Substituted Methanedisulfonamides and N'-Substituted Methanedisulfonylureas. J Pharm Sci. Oct. 1961;50(10):842-4.

Masson et al., Are reactions between allylpotassiums and halotrimethylsilanes diffusion-controlled? ARKIVOC. Jun. 2015;4:139-50.

International Search Report and Written Opinion for International Application No. PCT/US2021/051025 mailed Jan. 4, 2022.

\* cited by examiner

ELECTROLYTES FOR REDUCED GASSING

RELATED APPLICATIONS

This application claims priority to U.S. Provisional Application No. 63/091,496, filed Oct. 14, 2020, which is incorporated herein by reference in its entirety.

TECHNICAL FIELD

Electrolytes, articles, and methods for reducing gases produced during the operation of an electrochemical cell are generally described.

BACKGROUND

Some existing Li-ion batteries may have short cycle lives and produce significant amounts of gaseous products (e.g., gaseous by-products) when components of the battery (e.g., the electrolyte) decompose. Accordingly, improved electrolytes, articles and methods are needed.

SUMMARY

Additives for electrolytes, articles, and methods are generally described. In some embodiments, electrolytes, articles, and methods can result in a significant reduction in the amount of gases produced (e.g., by electrolyte decomposition) when used in an electrochemical cell (e.g., a battery) compared to certain existing systems. As described in more detail herein, electrolytes additives herein may comprise silylated sulfonic acid esters (i.e., silyl sulfonates). In some embodiments, electrolytes comprising a silylated sulfonic acid ester may form a protective coating on the surface of an electrode (e.g., a lithium metal anode, a cathode comprising a transition metal) when used in an electrochemical cell. The silylated sulfonic acid ester may reduce the amount of gas (e.g., gaseous by-products) formed during operation of the electrochemical cell relative to an electrochemical cell without the silylated sulfonic acid ester. The subject matter of the present invention involves, in some cases, interrelated products, alternative solutions to a particular problem, and/or a plurality of different uses of one or more systems and/or articles.

In one aspect, an electrolyte, comprising a plurality of conductive ions, at least one solvent, and at least one silylated sulfonic acid ester is described.

In another aspect, an article comprising an electrode and a coating adjacent to the electrode is described, wherein the coating comprises a reaction product of a silylated sulfonic acid ester and a transition metal.

In different aspect, a method of forming a coating on an electrode is described, the method comprising exposing an electrode to a solution and forming the coating on the electrode. The solution comprises a silylated sulfonic acid ester.

In another aspect, an electrolyte additive is described, comprising the formula:

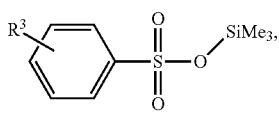

wherein $R^3$ is selected from hydrogen; substituted or unsubstituted, branched or unbranched aliphatic; substituted or unsubstituted cyclic; substituted or unsubstituted, branched or unbranched acyclic; substituted or unsubstituted, branched or unbranched heteroaliphatic; substituted or unsubstituted, branched or unbranched acyl; substituted or unsubstituted aryl; and substituted or unsubstituted heteroaryl.

In another aspect, an electrolyte additive is described, comprising the formula:

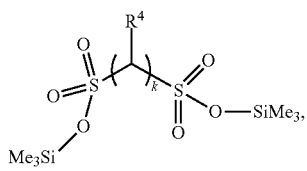

wherein $R^4$ is hydrogen; selected from substituted or unsubstituted, branched or unbranched aliphatic; substituted or unsubstituted cyclic; substituted or unsubstituted, branched or unbranched acyclic; substituted or unsubstituted, branched or unbranched heteroaliphatic; substituted or unsubstituted, branched or unbranched acyl; substituted or unsubstituted aryl; and substituted or unsubstituted heteroaryl, and wherein $1 \leq k \leq 10$.

In another aspect, an electrolyte additive is described, comprising the formula:

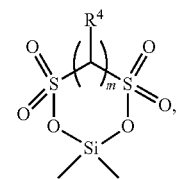

wherein $R^4$ selected from hydrogen; substituted or unsubstituted, branched or unbranched aliphatic; substituted or unsubstituted cyclic; substituted or unsubstituted, branched or unbranched acyclic; substituted or unsubstituted, branched or unbranched heteroaliphatic; substituted or unsubstituted, branched or unbranched acyl; substituted or unsubstituted aryl; and substituted or unsubstituted heteroaryl, and wherein where $1 \leq m \leq 10$.

In another aspect, an electrolyte additive is described, comprising the formula:

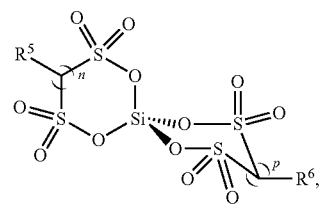

wherein, each $R^5$ and $R^6$ can be the same or different and each is independently selected from hydrogen; substituted or unsubstituted, branched or unbranched aliphatic; substituted or unsubstituted cyclic; substituted or unsubstituted, branched or unbranched acyclic; substituted or unsubstituted, branched or unbranched heteroaliphatic; substituted or unsubstituted, branched or unbranched acyl; substituted or unsubstituted aryl; and substituted or unsubstituted heteroaryl, wherein 1≤n≤10, and wherein 1≤p≤10.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1A:
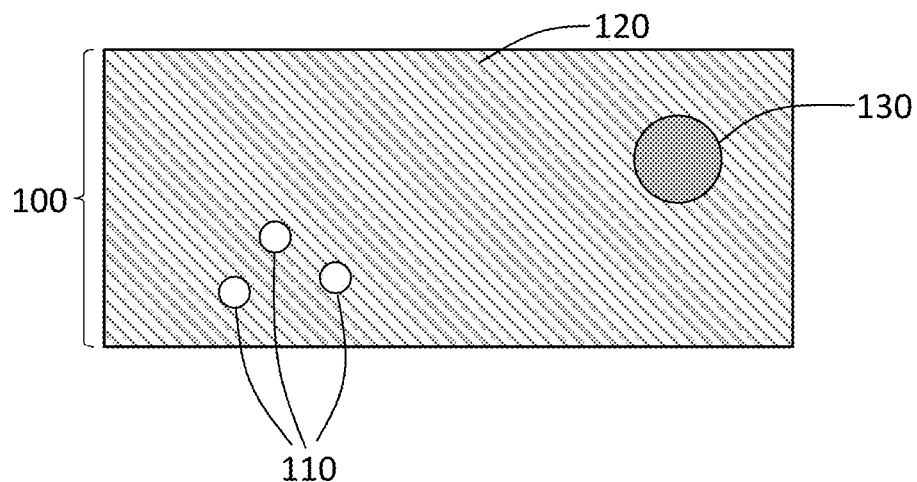
FIGS. 1A-1B are schematic diagrams of an electrolyte comprising at least one silylated sulfonic acid ester, according to some embodiments.

Articles, electrolytes, and methods described herein may be used to reduce the amount of gases produced in the operation of an electrochemical cell (e.g., a battery). For example, in the operation of some certain existing battery systems with two electrodes in electrochemical contact with an electrolyte, the operation of the battery may cause the electrolyte (or the solvent of the electrolyte) to decompose and produce gaseous by-products. These gaseous by-products can damage the battery or shorten the cycle life of the battery by prematurely degrading the electrolyte and/or its components. Articles (e.g., electrolytes, electrolyte additives) and methods described herein may reduce or eliminate the formation of gaseous by-products when compared to electrochemical cells of similar composition but absent the electrolyte additive, all other factors being equal. In some embodiments, this reduction or elimination of gaseous by-products can be achieved by the formation of a coating on an electrode (e.g., a cathode, an anode, a first electrode, a second electrode). In some embodiments, the coating on the electrode is formed on at least a part of the surface of an electrode.

In some embodiments, articles (e.g., electrolytes) and methods described herein may advantageously reduce or prevent the reaction of the electrolyte or its components by forming a coating adjacent to an electrode (e.g., a first electrode, a second electrode) and may act to protect the electrode and the electrolyte from forming gaseous by-products. In some embodiments, the electrolyte comprises at least one silylated sulfonic acid ester (SSAE). As described in more detail below, the addition of a SSAE may advantageously reduce (or eliminate) the formation of undesired gaseous by-products that, as stated above, may damage the electrochemical cell (e.g., a battery) or may reduce the cycle life of the battery. Without wishing to be bound by any theory, it has been recognized and appreciated by this disclosure that silylated sulfonic acid esters may advantageously react at the surface of an electrode (e.g., a cathode, an anode, a first electrode) during electrochemical cell operation to form a reaction product and/or a coating that comprises sulfur and silicon, which may prevent or reduce the formation of undesired gaseous by-products.

As described herein, silylated sulfonic acid esters can be used as electrolyte additives which may reduce the formation of gaseous by-products in an electrochemical cell. In some embodiments, electrolytes, articles, and methods comprise a silylated sulfonic acid ester as described below. As understood by those skilled in the art, a silylated sulfonic acid ester is the product of the reaction between a sulfonic acid and a silanol. However, other reactions may produce silylated sulfonic acid esters, as the formation of these compounds is not limited to only the reaction of a sulfonic acid and a silanol. It will be understood by those skilled in the art that silylated sulfonic acid esters may also be referred to as silyl sulfonates. As one example, a silylated sulfonic acid ester may comprise bis(trimethylsilyl) sulfate, as shown here:

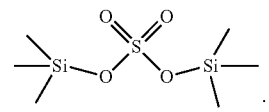

This compound can be formed by the reaction of sulfuric acid with trimethylsilanol, although other synthetic routes can be used to form this compound. For example, this compound may also be formed by the reaction of sulfuric acid with chlorotrimethylsilane. Other synthetic routes are possible and those skilled in art, in view of the present disclosure, will be capable of identifying other synthetic routes to produce silylated sulfonic acid esters. One example of another synthetic route is described in more detail elsewhere herein. In some embodiments, the inclusion of the silyl sulfonic acid ester bis(trimethylsilyl) sulfate as an electrolyte additive can reduce the amount of gases by-products of an electrochemical cell comprising the electrolyte when compared to an electrochemical cell absent the bis(trimethylsilyl) sulfate. Additional examples of silylated sulfonic acid esters (i.e., silyl sulfonates) are described in more detail below.

In some embodiments, an electrolyte additive comprises the formula:

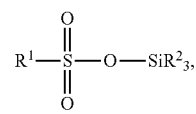

wherein, each R¹ and R² can be the same or different and each is independently selected from hydrogen; substituted or unsubstituted, branched or unbranched aliphatic; substituted or unsubstituted cyclic; substituted or unsubstituted, branched or unbranched acyclic; substituted or unsubstituted, branched or unbranched heteroaliphatic; substituted or unsubstituted, branched or unbranched acyl; substituted or unsubstituted aryl; and substituted or unsubstituted heteroaryl. In some embodiments, R¹ and R² are each independently selected from substituted or unsubstituted nitroaryl; substituted or unsubstituted fused aryl; and substituted or unsubstituted perfluoroalkyl aryl. In some embodiments, the electrolyte additive comprises the formula:

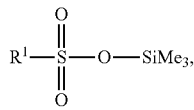

wherein R¹ is selected from hydrogen; substituted or unsubstituted, branched or unbranched aliphatic; substituted or unsubstituted cyclic; substituted or unsubstituted, branched or unbranched acyclic; substituted or unsubstituted, branched or unbranched heteroaliphatic; substituted or unsubstituted, branched or unbranched acyl; substituted or unsubstituted aryl; and substituted or unsubstituted heteroaryl. In some embodiments, R¹ is selected from substituted or unsubstituted nitroaryl; substituted or unsubstituted fused aryl; and substituted or unsubstituted perfluoroalkyl aryl. In some embodiments, the electrolyte additive comprises the formula:

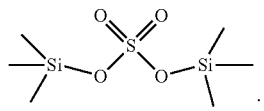

In some embodiments, the silylated sulfonic acid ester comprises an aromatic sulfonic acid ester. In some embodiments, an electrolyte additive comprises the formula:

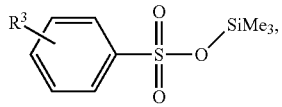

wherein R³ is selected from hydrogen; substituted or unsubstituted, branched or unbranched aliphatic; substituted or unsubstituted cyclic; substituted or unsubstituted, branched or unbranched acyclic; substituted or unsubstituted, branched or unbranched heteroaliphatic; substituted or unsubstituted, branched or unbranched acyl; substituted or unsubstituted aryl; and substituted or unsubstituted heteroaryl. In some embodiments, R³ is selected from substituted or unsubstituted nitroaryl; substituted or unsubstituted fused aryl; and substituted or unsubstituted perfluoroalkyl aryl. In some embodiments, the electrolyte additive comprises the formula:

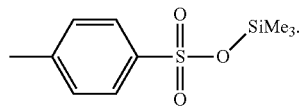

In some embodiments, a silylated sulfonic acid ester comprises a linked bisulfonate. In some embodiments, an electrolyte additive comprises the formula:

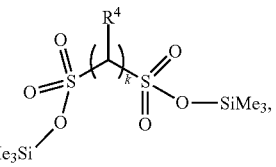

wherein R⁴ is selected from hydrogen; substituted or unsubstituted, branched or unbranched aliphatic; substituted or unsubstituted cyclic; substituted or unsubstituted, branched or unbranched acyclic; substituted or unsubstituted, branched or unbranched heteroaliphatic; substituted or unsubstituted, branched or unbranched acyl; substituted or unsubstituted aryl; and substituted or unsubstituted heteroaryl, and wherein $1 \leq k \leq 10$. For example, in some cases, k=1, 2, 3, 4, 5, 6, 7, 8, 9, or 10. In some embodiments, R⁴ is selected from substituted or unsubstituted nitroaryl; substituted or unsubstituted fused aryl; and substituted or unsubstituted perfluoroalkyl aryl. In some embodiments, the electrolyte additive comprises the formula:

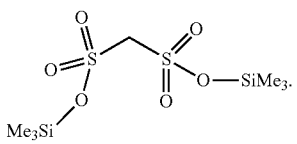

In some embodiments, a silylated sulfonic acid ester comprises a cyclic sulfonic acid ester. In some embodiments, an electrolyte additive comprises the formula:

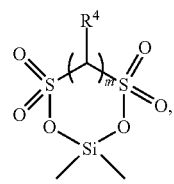

wherein R⁴ is selected from hydrogen; substituted or unsubstituted, branched or unbranched aliphatic; substituted or unsubstituted cyclic; substituted or unsubstituted, branched or unbranched acyclic; substituted or unsubstituted, branched or unbranched heteroaliphatic; substituted or unsubstituted, branched or unbranched acyl; substituted or unsubstituted aryl; and substituted or unsubstituted heteroaryl, and wherein where $1 \leq m \leq 10$. For example, in some cases, m=1, 2, 3, 4, 5, 6, 7, 8, 9, or 10. In some embodiments, R⁴ is selected from substituted or unsubstituted nitroaryl; substituted or unsubstituted fused aryl; and substituted or unsubstituted perfluoroalkyl aryl. In some embodiments, the electrolyte additive comprises the formula:

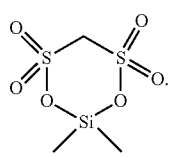

In some embodiments, an electrolyte additive comprises the formula:

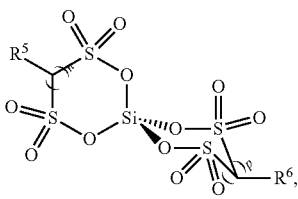

wherein, each $R^5$ and $R^6$ can be the same or different and each is independently selected from hydrogen; substituted or unsubstituted, branched or unbranched aliphatic; substituted or unsubstituted cyclic; substituted or unsubstituted, branched or unbranched acyclic; substituted or unsubstituted, branched or unbranched heteroaliphatic; substituted or unsubstituted, branched or unbranched acyl; substituted or unsubstituted aryl; and substituted or unsubstituted heteroaryl, wherein $1 \leq n \leq 10$, and wherein $1 \leq p \leq 10$. For example, in some cases, n=1, 2, 3, 4, 5, 6, 7, 8, 9, or 10, and, in some cases, p=1, 2, 3, 4, 5, 6, 7, 8, 9, or 10. In some embodiments, $R^5$ and $R^6$ are independently selected from substituted or unsubstituted nitroaryl; substituted or unsubstituted fused aryl; and substituted or unsubstituted perfluoroalkyl aryl. In some embodiments, the electrolyte additive comprises the formula:

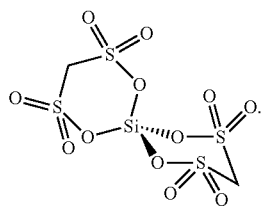

As described above, silylated sulfonic acid esters can comprise branched or unbranched aliphatic as R-groups (e.g., $R^1$, $R^2$, $R^3$ ... $R^6$). The term "aliphatic" describes the radical of saturated aliphatic groups, including straight-chain alkyl groups (acyclic), branched-chain alkyl groups, cycloalkyl (cyclic) groups, alkyl substituted cycloalkyl groups, and/or cycloalkyl substituted alkyl groups from a designated attachment site on a molecule. The aliphatic groups may be optionally substituted, as described more fully below. Some examples of alkyl groups include, but are not limited to, methyl, ethyl, propyl, isopropyl, butyl, isobutyl, tert-butyl, 2-ethylhexyl, cyclopropyl, cyclobutyl, cyclopentyl, cyclohexyl, and the like.

Heteroaliphatic R-groups (e.g., $R^1$, $R^2$, $R^3$ ... $R^6$) comprise heteroalkyl groups, which are aliphatic groups wherein at least one atom is a heteroatom (e.g., oxygen, sulfur, nitrogen, phosphorus, silicon, etc.), with the remainder of the atoms belonging to aliphatic groups as described above. Some examples of heteroaliphatic groups include, but are not limited to, alkoxy, alkylsiloxy, poly(ethylene glycol)-, alkyl-substituted amino, tetrahydrofuranyl, piperidinyl, morpholinyl, etc.

The term "acyl" (e.g., carbonyl group) includes such moieties as can be represented by the general formula:

wherein W is H, halogen (e.g., F, Cl, Br, I), OH, O-alkyl, O-alkenyl, or a salt thereof. Where W is O-alkyl, the formula represents an ester. When W is OH, the formula represents a carboxylic acid. In general, when the oxygen atom of the above formula is replaced by sulfur, the formula represents a thiocarbonyl group. When W is a S-alkyl, the formula represents a thioester. When W is SH, the formula represents a thiocarboxylic acid. In other cases, when W is alkyl, the above formula represents a ketone group. When W is hydrogen, the above formula represents an aldehyde group. And when W is a halogen, the above formula represents an acyl halide.

The term "aryl" refers to an aromatic carbocyclic group having a single ring (e.g., phenyl), multiple rings (e.g., biphenyl), or multiple fused rings in which at least one is aromatic (e.g., 1,2,3,4-tetrahydronaphthyl, naphthyl, anthryl, or phenanthryl), all optionally substituted. A Heteroaryl group is an aryl groups wherein at least one ring atom in the aromatic ring is a heteroatom, with the remainder of the ring atoms being carbon atoms. Examples of heteroaryl groups include furanyl, thienyl, pyridyl, pyrrolyl, N lower alkyl pyrrolyl, pyridyl N oxide, pyrimidyl, pyrazinyl, imidazolyl, indolyl and the like, all optionally substituted. The term "nitroaryl" refers to an aryl group as described above, wherein one or more nitro ($-NO_2$) groups replaces a substituent on the aromatic carbocycle.

The term "perfluoroalkyl aryl" refers to an aryl group as described above, wherein one or more perfluoroalkyl moieties (e.g., $-CF_3$, $-CF_2CF_3$) replaces a substituent on the aromatic carbocycle. In general, perfluroalkyl groups refer to aliphatic groups where C—H bonds have been replaced with C—F bonds. Non-limiting examples of perfluoroalkyl groups include trifluoromethyl ($-CF_3$), 1,1-difluoro-2,2,2-trifluoroethyl ($-CF_2CF_3$), and 1,1-difluoro-2,2-difluoro-3,3,3-trifluoropropyl ($-CF_2CF_2CF_3$).

The term "substituted" is contemplated to include all permissible substituents of organic compounds, "permissible" being in the context of the chemical rules of valence known to those of ordinary skill in the art. In some cases, "substituted" may generally refer to replacement of a hydrogen with a substituent as described herein. Thus "unsubstituted" refers to a case where a hydrogen on an atom has not been replaced, such as the hydrogens of an aliphatic group. However, "substituted," as used herein, does not encompass replacement and/or alteration of a key functional group by which a molecule is identified, e.g., such that the "substituted" functional group becomes, through substitution, a different functional group. For example, a "substituted phenyl" must still comprise the phenyl moiety and cannot be modified by substitution, in this definition, to become, e.g., a heteroaryl group such as pyridine. In a broad aspect, the permissible substituents include acyclic and cyclic, branched and unbranched, carbocyclic and heterocyclic, aromatic and nonaromatic substituents of organic compounds. Illustrative substituents include, for example, those described herein. The permissible substituents can be one or more and the same or different for appropriate organic compounds. For purposes of this disclosure, the heteroatoms such as nitrogen may have hydrogen substituents and/or any permissible substituents of organic compounds described herein which satisfy the valencies of the heteroatoms. This disclosure is not intended to be limited in any manner by the permissible substituents of organic compounds.

Examples of substituents include, but are not limited to, alkyl, aryl, aralkyl, cyclic alkyl, heterocycloalkyl, hydroxy, alkoxy, aryloxy, perhaloalkoxy, arylalkoxy, heteroaryl, heteroaryloxy, heteroarylalkyl, heteroaralkoxy, azido, amino, halogen, alkylthio, oxo, acyl, acylalkyl, carboxy esters, carboxyl, carboxamido, nitro, acyloxy, aminoalkyl, alkylaminoaryl, alkylaryl, alkylaminoalkyl, alkoxyaryl, arylamino, aralkylamino, alkylsulfonyl, carboxamidoalkylaryl, carboxamidoaryl, hydroxyalkyl, haloalkyl, alkylaminoalkylcarboxy, aminocarboxamidoalkyl, alkoxyalkyl, perhaloalkyl, arylalkyloxyalkyl, and the like. Other substituents are possible.

In some embodiments, silylated sulfonic acid esters, such as those described above) are added (i.e., are additives) to an electrolyte. The electrolyte may further comprise a solvent (e.g., a carbonate-based solvent, or another solvent described herein) and a plurality of conductive ions (e.g. Li-ions, lithium salts), in addition to the SSAE. In some embodiments, a mixture of SSAEs can be used, such that the electrolyte comprises two, three, four, or more SSAEs.

In some embodiments, only a relatively small amount of SSAE is needed to afford protection to an electrode and/or to reduce the formation of gaseous by-products in an electrochemical cell comprising the SSAE. That is to say, the SSAE may be a minority component of the electrolyte, while the solvent and/or the plurality of conductive ions is present at a concentration higher than the SSAE. This can advantageously limit the amount of SSAE needed to afford electrode protection and/or to reduce the formation of gaseous by-products from the electrolyte. In some embodiments, the quantity (e.g., a concentration) of SSAE is high enough to afford electrode protection and/or reduced gassing, but is not so high as to substantially increase the viscosity of the electrolyte, which may lower the cycle life and rate capability of the electrochemical cell. For example, in some embodiments, the viscosity of the electrolyte increases by less than or equal to 10%, less than or equal to 8%, less than or equal to 6%, less than or equal to 4%, less than or equal to 2%, less than or equal to 1%, or 0%, relative to an electrolyte without the SSAE, all other factors being equal. Examples of quantities of SSAEs are described in more detail below.

The concentration of a SSAE can be relatively low compared to the concentration of other components in the electrolyte. In some embodiments, the concentration of the silylated sulfonic acid ester in the electrolyte is less than or equal to 10 wt %, less than or equal to 8 wt %, less than or equal to 6 wt %, less than or equal to 5 wt %, less than or equal to 4 wt %, less than or equal to 3 wt %, less than or equal to 2 wt %, less than or equal to 1 wt %, less than or equal to 0.1 wt %, or less than or equal to 0.01 wt % based on the total weight of the electrolyte. In some embodiments, the concentration of the silylated sulfonic acid ester in the electrolyte is greater than or equal to 0.01 wt %, greater than or equal to 0.1 wt %, greater than or equal to 1 wt %, greater than or equal to 2 wt %, greater than or equal to 3 wt %, greater than or equal to 4 wt %, greater than or equal to 5 wt %, greater than or equal to 6 wt %, greater than or equal to 8 wt %, or greater than or equal to 10 wt % based on the total weight of the electrolyte. Combinations of the above-referenced ranges are also possible (e.g., less than or equal to 8 wt % and greater than or equal to 0.1 wt %). Other ranges are possible.

A SSAE may form a coating on the electrode by, for example, forming a reaction product on at least a portion of the surface of an electrode. In some embodiments, a coating is formed on an entire surface of the electrode. In other embodiments, a coating is formed on a portion, but not all, of the surface of the electrode. In some embodiments, the coating comprises sulfur and silicon. The coating may advantageously protect the electrode surface from degradation of the electrolyte or otherwise enhance the stability of the electrode or other components of the cell. The coating may also reduce or prevent other components (e.g., a solvent, a plurality of conductive ions) from reacting at the surface of the electrode or forming gaseous by-products. More details about the reaction product and coating are described in the context of the figures below.

As described herein, inclusion of SSAE additives to electrolyte solutions may reduce the formation of gaseous by-products formed during the operation of an electrochemical cell comprising an electrolyte containing the SSAE additive compared to an electrochemical cell absent the SSAE, all other factors being equal. In some embodiments, the amount of gas formed by an electrochemical cell comprising an SSAE is reduced by greater than or equal to 30% relative to a similar electrochemical cell without the SSAE. This effect is described in more detail elsewhere herein. Without wishing to be bound by any particular theory, the reduction in the formation of gaseous by-products may be a result of a coating formed on an electrode, which may reduce gaseous decomposition of the solvent component of the electrolyte at the surface of the electrode.

Electrolytes, articles, or methods described herein may cause a plurality of gases produced by an electrochemical cell (e.g., a lithium-ion battery) to be reduced relative to the electrochemical cell absent these electrolytes, articles, or methods. In some embodiments, the reduction (e.g., a decrease) of gas formation (e.g., gaseous by-products) in an electrochemical cell comprising the silylated sulfonic acid esters described herein is greater than or equal to 1 vol %, greater than or equal to 5 vol %, greater than or equal to 10 vol %, greater than or equal to 15 vol %, greater than or equal to 20 vol %, greater than or equal to 25 vol %, greater than or equal to 30 vol %, or greater than or equal to 35 vol % relative to the electrochemical cell absent the silylated sulfonic acid ester, all other factors being equal. In some embodiments, the reduction of gas formation in the electrochemical cell comprising the silylated sulfonic acid esters described herein is less than or equal to 30 vol %, less than or equal to 25 vol %, less than or equal to 20 vol %, less than or equal to 15 vol %, less than or equal to 10 vol %, less than or equal to 5 vol %, or less than or equal to 1 vol % relative to the electrochemical cell absent the silylated sulfonic acid ester, all other factors being equal. Example comparisons and measurements of this effect are described elsewhere herein.

The electrolyte additives described herein (e.g., SSAE) when included in an electrochemical cell may reduce the volume of gaseous products (e.g., gaseous by-products) relative to an electrochemical cell absent the electrolyte additive with all other factors being equal. The amount (e.g., a volume) of gaseous products produced in electrochemical cells can be determined using Archimedes method, a technique known in the art, where an electrochemical cell is attached to a wire and submersed in a fluid of a known density and temperature. The wire is attached to a balance (e.g., to determine the mass of an electrochemical cell) and the buoyant force of the fluid acting on the electrochemical cell can be measured by the mass reading on the balance, which can be used to determine the volume of gas produced as a function of time as the cell is cycled. One advantage to this method is that the volume of the electrochemical cell (e.g., before cycling, after cycling) can be determined without opening the electrochemical cell (e.g., an assembled electrochemical cell, a sealed electrochemical cell) and may be used to determine the volume of the electrochemical cell and the volume of gaseous products produced. As a hypothetical example, electrochemical cells A and B can be prepared that are substantially similar, except that electrochemical cell B includes a SSAE as described herein. Archimedes method, as described above, can be used on both cells to determine the amount of gaseous products produced in the electrochemical cells before, during, or after charging/discharging. The amount of gas produced by electrochemical cells A and B can then be compared and a percent reduction of gaseous products in electrochemical cell B can be determined by comparing to the amount of gaseous products produced in electrochemical cell A. In some cases, the electrochemical cells may subject to a thermal treatment after one or more charge/discharge cycles, for example, to liberate dissolved gases from the electrolyte.

In some embodiments, the volume of gaseous products in the electrochemical cell is less than or equal to 50 vol %, 45 vol %, 40 vol %, 35 vol %, 30 vol %, 25 vol %, 20 vol %, 15 vol %, 10 vol %, 5 vol %, or 1 vol % relative to the total volume of the electrochemical cell. In some embodiments, the volume of gaseous products in the electrochemical cell is greater than equal 1 vol %, 5 vol %, 10 vol %, 15 vol %, 20 vol %, 30 vol %, 35 vol %, 40 vol %, 45 vol %, or 50 vol % relative to the total volume of the electrochemical cell. Combinations of the above-referenced ranges are also possible (e.g., greater than or equal to 1 vol % and less than or equal to 20 vol % relative to the total volume of the electrochemical cell). Other ranges are possible. The volume of the electrochemical cell can be determined as described above using Archimedes method by determining the volume of the cell prior to charge/discharge cycling. Subsequently, the volume of gaseous products formed within the electrochemical cell can be determined during and/or after charge/discharge cycling in order to determine the volume of the gaseous products relative to the total volume of the electrochemical cell.

Inclusion of an electrolyte comprising a SSAE can advantageously improve the cycle life of an electrochemical cell (e.g., a lithium-ion battery) relative to the same electrochemical cell but absent the silylated sulfonic acid ester. In some embodiments, an increase in cycle life in an electrochemical cell comprising the silylated sulfonic acid esters described herein is greater than or equal to 5%, greater than or equal to 10%, greater than or equal to 15%, greater than or equal to 20%, greater than or equal to 25%, greater than or equal to 30%, or greater than or equal to 35% relative to the electrochemical cell absent the silylated sulfonic acid ester, all other factors being equal. In some embodiments, an increase in the cycle life in an electrochemical cell comprising the silylated sulfonic acid esters described herein is less than or equal to 35%, less than or equal to 30%, less than or equal to 25%, less than or equal to 20%, less than or equal to 15%, less than or equal to 10%, or less than or equal to 5% relative to the electrochemical cell absent the silylated sulfonic acid ester, all other factors being equal. Examples and measurements of this effect are described below.

Figure 1B:
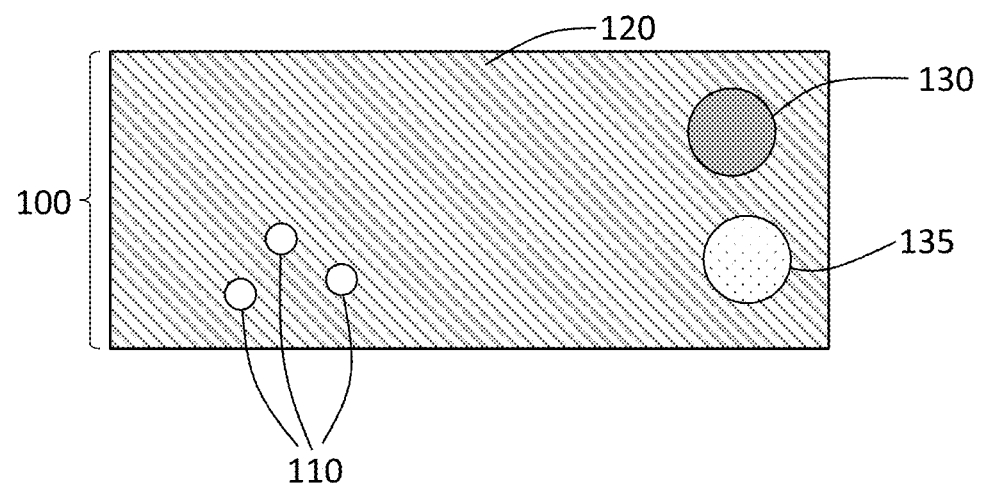

Electrolytes comprising a solvent, a plurality of conductive ions, and at least one silylated sulfonic acid ester can be used an electrochemical cell (e.g., a battery) and may reduce the amount of gases produced by the cell. Referring now to FIG. 1, an electrolyte 100 is schematically illustrated. Electrolyte 100 comprises a plurality of conductive ions 110 dispersed within electrolyte 100. Electrolyte 100 also comprises a first silylated sulfonic acid ester 130 and a second silylated sulfonic acid ester 135.

In some embodiments, an electrolyte comprises a mixture (i.e., more than one) SSAEs. For example, referring to FIG. 1B, electrolyte 100 comprises a first silylated sulfonic acid ester 130 and a second silylated sulfonic acid ester 135, in addition to plurality of conductive ions 110. The first and second silylated sulfonic acid esters may be the same or different (e.g., have different chemical compositions).

In some embodiments, a coating is positioned adjacent to an electrode (e.g., a first electrode, a second electrode). The coating may comprise a reaction product of a silylated sulfonic acid ester and a metal (e.g., lithium metal, a transition metal). FIGS. 2A-2D, schematically illustrate a SSAE in an electrolyte forming a reaction product on an electrode. Starting with FIG. 2A, an electrolyte 220 comprises a silylated sulfonic acid ester, such as first and second silylated sulfonic acid esters 230 and 235, respectively. Electrolyte 220 can be a component in an electrochemical cell, as pictured in the figure, with a first electrode 210 and second electrode 240. In some embodiments, an optional layer 260 is positioned adjacent to first electrode 210. In some embodiments, optional layer 260 may be a release layer positioned adjacent to first electrode 210 or a polymer layer adjacent to first electrode 210.

In some cases, the first silylated sulfonic acid ester may be positioned proximate (e.g., adjacent) to the second electrode. As shown illustratively in FIG. 2B, first silylated sulfonic acid ester 230 can contact second electrode 240, and, upon contacting with second electrode 240, a reaction may initiate between a material (e.g., a metal, a transition metal) within second electrode 240 and first silylated sulfonic acid ester 230 and may result in formation of a reaction product. While contact of the SSAE can cause a reaction product to form, in other embodiments, the reaction product does not form until after other conditions are met (e.g., application of a voltage to the electrode, cycling of the electrochemical cell, additional SSAE contact).

Figure 2A:
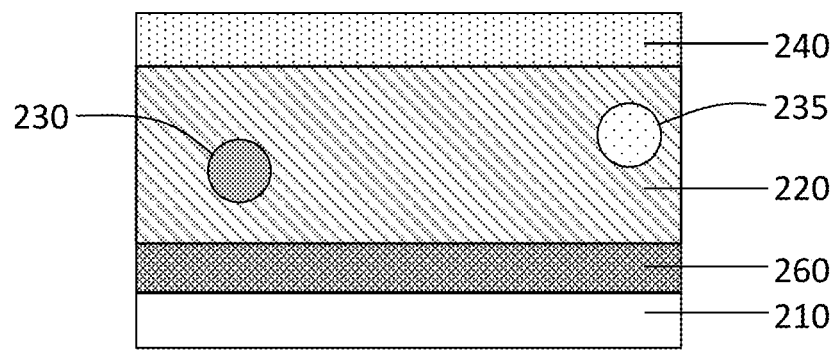
FIGS. 2A-2D are schematic illustrations of a silylated sulfonic acid ester forming a reaction product and/or a coating on the surface of an electrode, according to some embodiments.
Figure 2B:
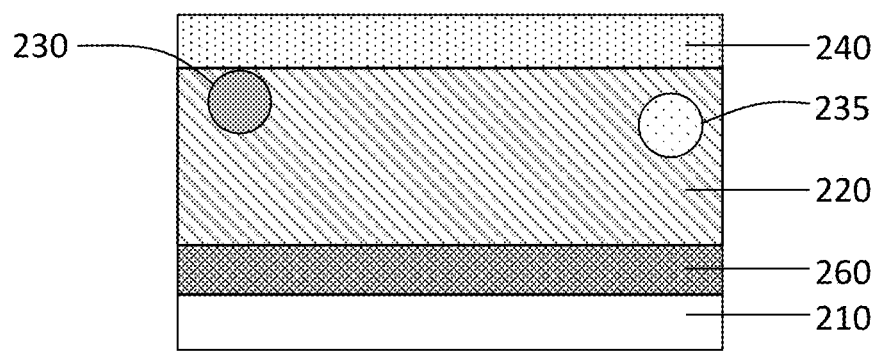
Figure 2C:
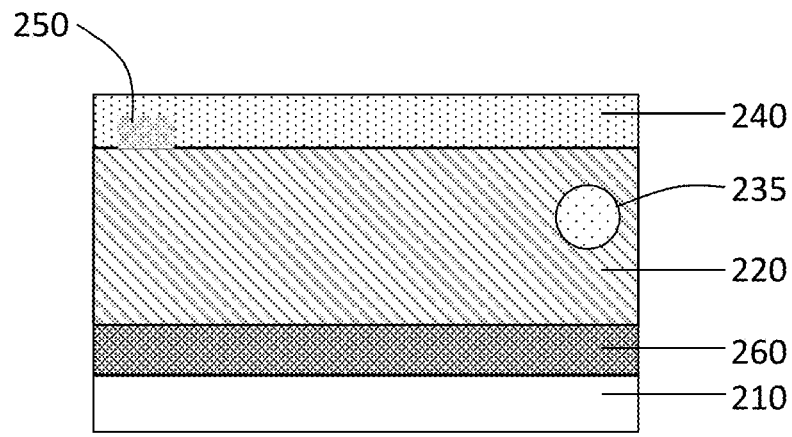
Figure 2D:
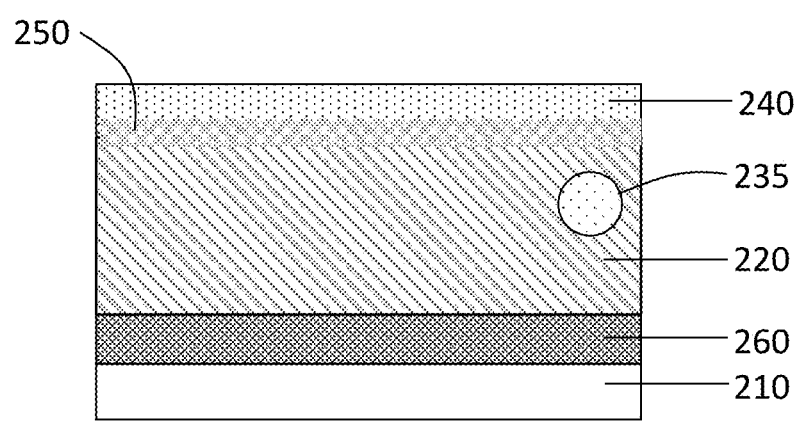

FIG. 2C shows that in some embodiments, reaction product 250 may form proximate the surface of second electrode 240. In some cases, formation of a reaction product may consume first silylated sulfonic acid 230, which is now absent in FIG. 2C. Reaction product 250 may form proximate a portion of second electrode 240 as shown in FIG. 2C; however, in some cases, reaction product 250 may form an entire coating along second electrode 240, as schematically depicted in FIG. 2D. In this way, a coating adjacent (e.g., directly adjacent) to the electrode (e.g., anode 250) is present. In some embodiments, the coating comprises a reaction product of the SSAE, for example first silylated sulfonic acid 230, and a material forming an electrode, for example electrode 240. In some embodiments, the coating and/or the reaction product comprises sulfur and silicon.

As used herein, when a coating is referred to as being "adjacent" to an electrode (e.g., a first electrode, a second electrode), it can be directly adjacent to the electrode, or one or more intervening components (e.g., a layer, an additional coating) may also be present. A coating that is "directly adjacent" to a coating means that no intervening component is present.

Figure 5:
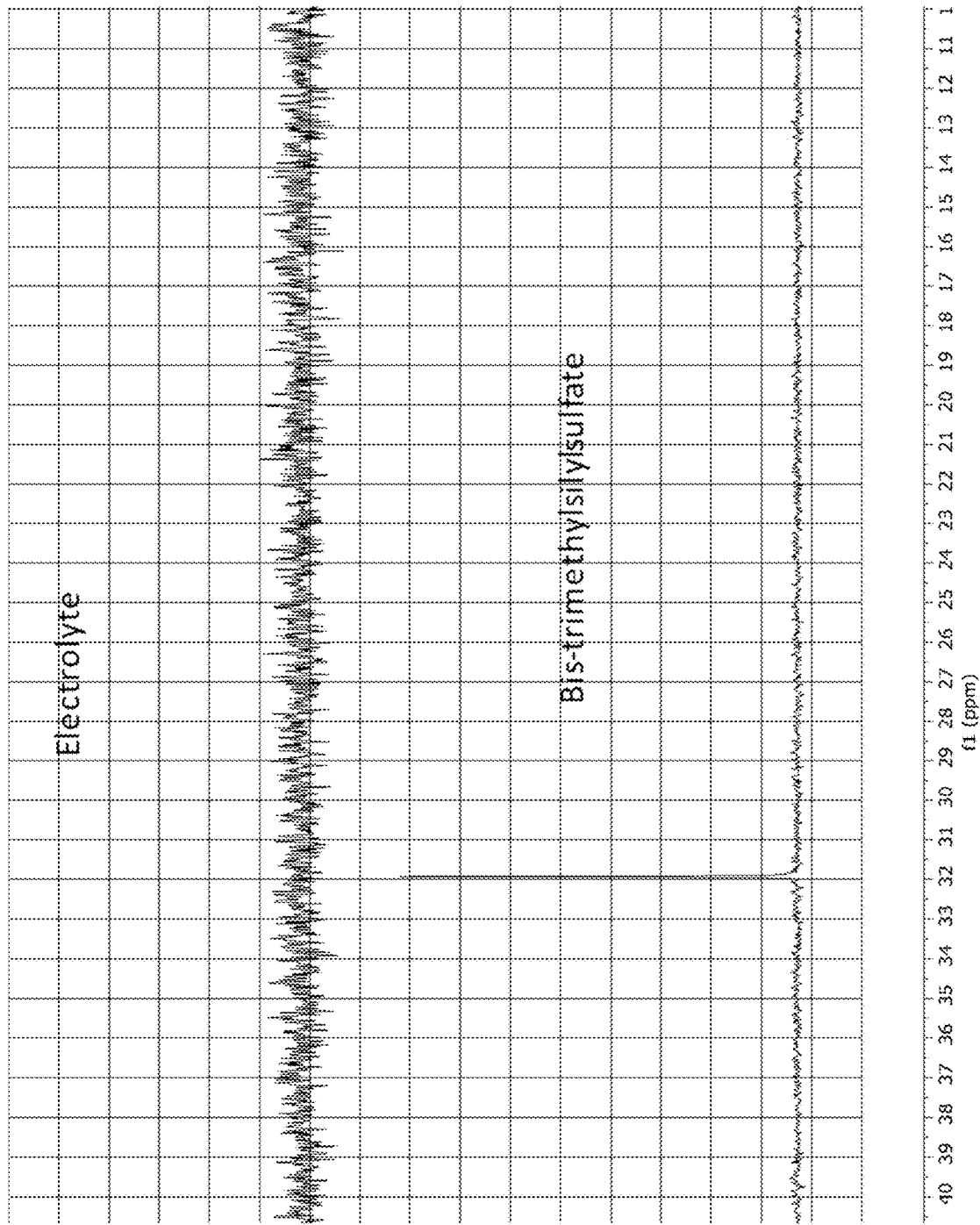
FIG. 5 is a $^{29}$Si NMR spectrum showing the absence of silicon in electrolyte after use in an electrochemical cell, according to one embodiment.

In some embodiments, a reaction product comprising Si and S forms. The reaction product may form when two or more species (e.g., a SSAE and a transition metal) react. It will be understood by those skilled in the art that in some embodiments, intermediate reactions between the SSAE and the electrode (e.g., a transition metal material within the electrode) may occur before forming a final reaction product that comprises Si and S. In some embodiments, the reaction between the SSAE and the electrode material results in a reaction product on the surface of the electrode, the reaction product containing at least a portion of the Si and S of the SSAE. In some embodiments, upon reaction with a surface of the electrode or a transition metal material within an electrode, at least a portion of the SSAE may be consumed, such that the amount (e.g., a concentration) of the SSAE is reduced relative to the amount of the SSAE prior to reaction of the SSAE with the surface of the electrode or a transition metal material within the electrode. For example, as schematically illustrated in FIGS. 2B-2C, consumption of the SSAE can be determined by a variety of methods known to those skilled in the art. For example, NMR spectroscopy of the electrolyte solution before and after cycling can be used to indicate consumption of the SSAE. Indeed, as shown in the $^{29}$Si NMR spectrum of FIG. 5, the electrolyte taken from an electrochemical cell after several cycles is absent any silicon NMR signals compared to the bis-trimethylsilyl sulfate comparison of the electrolyte prior to use an electrochemical cell/prior to cycling, indicating that the electrolyte additive has been consumed after use in the electrochemical cell. The reaction product can be a part of or a precursor to forming a coating on the surface of the electrode.

The coating can act to protect an electrode (e.g., a first electrode, a second electrode, or combinations thereof) from reacting with components of the electrolyte, such as the solvent, thereby reducing the formation of gaseous decomposition products (e.g., decomposed solvent). In some embodiments, the coating protects the first electrode, the second electrode, or both, from reacting with components of the electrolyte. In some embodiments, the use of a silylated sulfonic acid ester results in the formation of a coating on the surface of the electrode. The coating may form as a result of a reaction of the SSAE with a surface of the electrode. In some embodiments, the coating may form as a result of the SSAE reacting with a transition metal, such as a transition metal of the electrode (e.g., the surface of the electrode) or a transition metal in solution. The SSAE may be consumed upon reacting at or near the surface of the electrode, such that an amount (e.g., a concentration) of the SSAE after the reaction is reduced relative to an amount of the SSAE prior to reacting at or near the surface of the electrode. However, in some embodiments, at least a portion (e.g., the entire SSAE) of the SSAE is not consumed. In this way, the SSAE can catalyze the formation of the coating. The coating can cover at least a portion (e.g., only a portion) of the electrode surface or the coating may cover the entire surface of the electrode surface.

Figure 3:
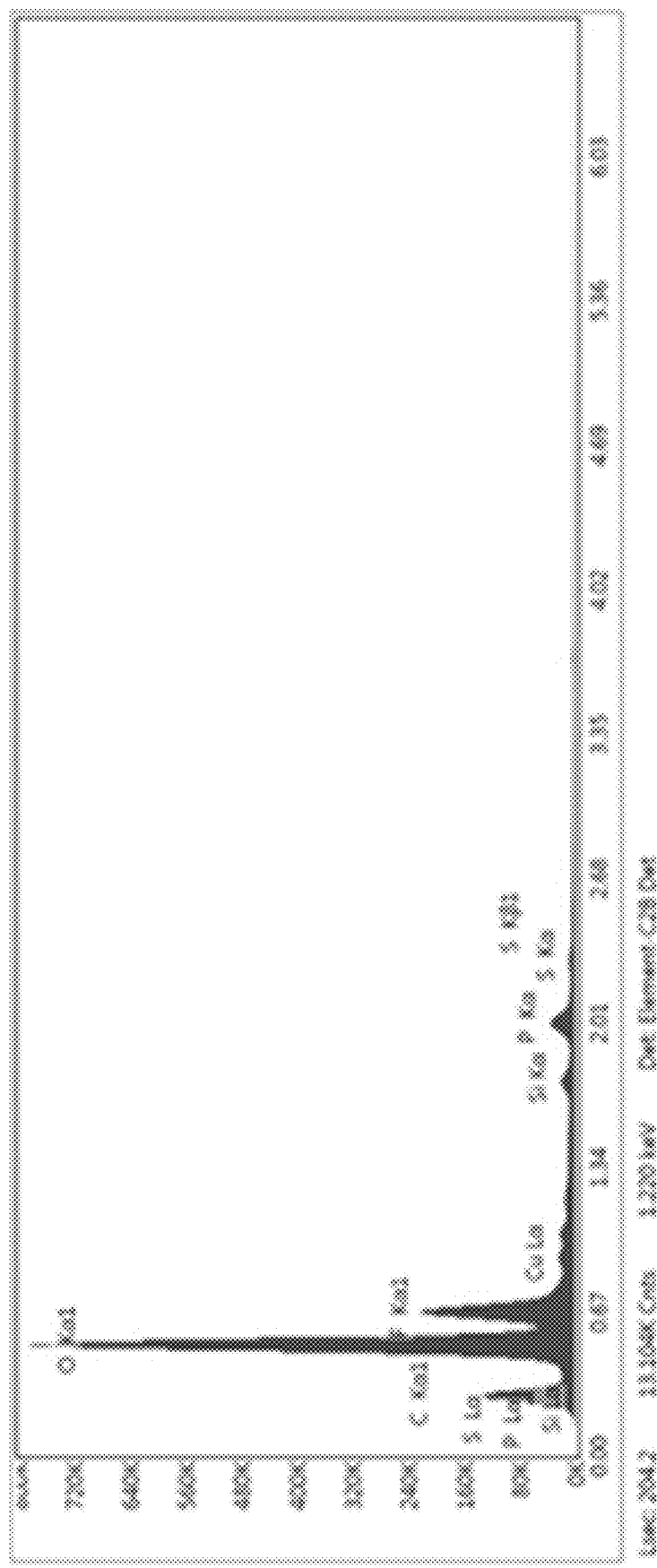
FIG. 3 is a plot of an energy dispersive x-ray spectrogram of an electrode surface after the electrode was used in an electrochemical cell with an electrolyte comprising a silylated sulfonic acid ester, according to one embodiment.
Figure 4:
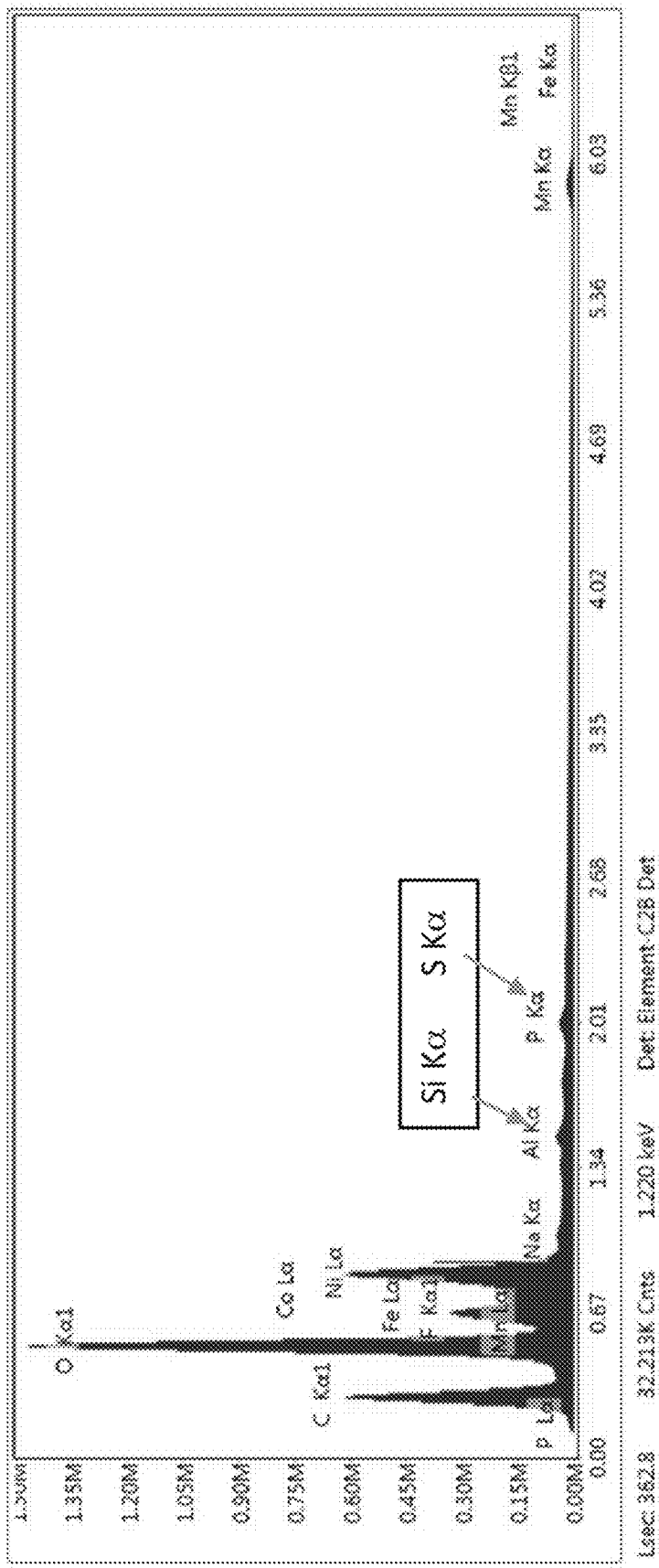
FIG. 4 is a plot of an energy dispersive x-ray spectrogram of an electrode surface showing signals for silicon and sulfur after the electrode was used in an electrochemical cell with an electrolyte comprising a silylated sulfonic acid ester, according to one embodiment.

In some embodiments, the electrode coating may comprise silicon (Si) and sulfur (S). The presence of Si and S in the electrode coating can be determine by any suitable method known to those skilled in the art. For example, referring to FIG. 3 and FIG. 4, energy-dispersive x-ray spectroscopy (EDX) analysis reveals the presence of both Si and S on the surface of some electrodes used in an electrochemical cell with SSAE electrolyte additives described herein. After cycling in an electrochemical cell with an electrolyte comprising at least one SSAE, the electrodes could be removed after use in an electrochemical cell and the surface composition of the electrodes determined by EDX analysis. Thus, the coating on the surface of the electrode is shown to comprise both sulfur and silicon, according to some embodiments. Without wishing to be bound by theory, the coating may comprise lithium sulfate and/or trimethylsilyl moieties.

The electrolyte may comprise a plurality of conductive ions. "Conductive ions" are given their ordinary meaning in the art to describe ions that are capable of passing from one location to another through an ion-permeable membrane, for example through an ionically conductive membrane. In some embodiments, the ions can also be electrically conducting. In some embodiments, the conductive ions comprise lithium ions, such as those from a lithium salt. Examples of lithium salts are described below.

In some embodiments, an electrolyte comprises one or more lithium salts to provide a plurality of conductive ions. Non-limiting examples of lithium salts include lithium hexafluorophosphate (LiPF$_6$), lithium bis(fluorosulfonyl) imide (LiFSI), lithium perchlorate (LiClO$_4$), lithium hexafluoroarsenate (LiAsF$_6$), lithium tetrafluoroborate (LiBF$_4$), lithium trifluromethanesulfonate (LiCF$_3$SO$_3$), and lithium bis(trifluoromethanesulfonyl)imide (LiTFSI). Additional non-limiting examples of lithium salts include LiSCN, LiBr, LiI, LiSO$_3$CH$_3$, LiNO$_3$, LiPF$_6$, LiBF$_4$, LiB(Ph)$_4$, LiClO$_4$, LiAsF$_6$, Li$_2$SiF$_6$, LiSbF$_6$, LiAlCl$_4$, lithium bis(oxalato)borate (LiBOB), lithium difluoro(oxalato)borate (LI-ODFB), LiCF$_3$SO$_3$, LiN(SO$_2$F)$_2$, LiN(SO$_2$CF$_3$)$_2$, LiC(C$_n$F$_{2n+1}$SO$_2$)$_3$ wherein n is an integer in the range of from 1 to 20, and (C$_n$F$_{2n+1}$SO$_2$)mXLi with n being an integer in the range of from 1 to 20, m being 1 when X is selected from oxygen or sulfur, m being 2 when X is selected from nitrogen or phosphorus, and m being 3 when X is selected from carbon or silicon Other lithium salts are possible.

Electrolytes described herein may comprise a solvent. The solvent can comprise a variety of liquids, including ether-based and/or carbonate-based organic solvents, as non-limiting examples. In certain existing systems, electrolyte degradation can result in the formation of gaseous by-products, also known as gassing. The release of these gaseous by-products in a battery can result in battery swelling, and in some cases, can result in battery damage or a battery explosion. Gassing may also reduce the cycling performance of the battery. As mentioned above, it has been recognized and appreciated within the context of this disclosure that the use of a SSAE as described herein may reduce the amount of gassing, which may also result in an increase of cycling performance of the battery.

In some embodiments, the electrolyte comprises a carbonate-based solvent. In some embodiments, the carbonate-based solvent comprises dimethyl carbonate and/or fluoroethylene carbonate. However, any suitable solvent (i.e., a solvent that dissolves the plurality of conductive ions and/or the SSAE) can be used. In some embodiments, the solvent (e.g., a liquid electrolyte solvent) is a non-aqueous solvent. Non-limiting examples of non-aqueous liquid electrolyte solvents include, but are not limited to, non-aqueous organic solvents, such as, for example, N-methyl acetamide, acetonitrile, acetals, ketals, esters, carbonates, sulfones, sulfites, sulfolanes, aliphatic ethers, cyclic ethers, glymes, polyethers, phosphate esters, siloxanes, dioxolanes (e.g., 1,3-dioxolane), N-alkylpyrrolidones, bis(trifluoromethanesulfonyl)imide, substituted forms of the foregoing, and blends thereof. Fluorinated derivatives of the foregoing are also useful as liquid electrolyte solvents. In some cases, aqueous solvents can be used as electrolytes for lithium cells. Aqueous solvents can include water, which can contain other components such as ionic salts. In some embodiments, the electrolyte can include species such as lithium hydroxide, or other species rendering the electrolyte basic, so as to reduce the concentration of hydrogen ions in the electrolyte.

In some embodiments, the electrolyte comprises an organic solvent that may comprise one or more of carbonate-based solvents selected from the group of fluoroethylene carbonate, dimethyl carbonate, diethyl carbonate, ethyl methyl carbonate, propylene carbonate, and ethylene carbonate. In some embodiments, the organic solvent may comprise a mixture of fluoroethylene carbonate and dimethyl carbonate. In some such embodiments, the weight-based ratio of fluoroethylene carbonate to dimethyl carbonate (FEC:DMC) in the organic solvent may be, in some cases, greater than or equal to 1:10, greater than or equal to 1:9, greater than or equal to 1:8, greater than or equal to 1:7, greater than or equal to 1:5, greater than or equal to 1:4, greater than or equal to 1:3, greater than or equal to 1:2, greater than or equal to 1:1, greater than or equal to 2:1, greater than or equal to 3:1, greater than or equal to 4:1, greater than or equal to 5:1, greater than or equal to 6:1, greater than or equal to 10:1, greater than or equal to 20:1, greater than or equal to 30:1, greater than or equal to 40:1, greater than or equal to 50:1, greater than or equal to 60:1, greater than or equal to 70:1, greater than or equal to 80:1, greater than or equal to 90:1, or greater than or equal to 100:1. In some embodiments, the weight-based ratio of fluoroethylene carbonate to dimethyl carbonate may be less than or equal to 100:1, less than or equal 90:1, less than or equal to 80:1, less than or equal to 70:1, less than or equal to 60:1, less than or equal to 50:1, less than or equal to 40:1, less than or equal to 30:1, less than or equal to 20:1, less than or equal to 10:1, less than or equal to 6:1, less than or equal to 5:1, less than or equal to 4:1, less than or equal to 3:1, less than or equal to 2:1, less than or equal to 1:1, less than or equal to 1:2, less than or equal to 1:3, less than or equal to 1:4, less than or equal to 1:5, less than or equal to 1:7, less than or equal to 1:8, less than or equal to 1:9, less than or equal to 1:10. Combinations of the above-referenced ranges are also possible (e.g., a weight ratio of fluoroethylene carbonate and dimethyl carbonate may be greater than or equal to 1:10 and less than or equal to 100:1). In some embodiments, the weight ratio of fluoroethylene carbonate to dimethyl carbonate in the organic solvent may is greater than or equal to 1:4 and less than or equal to 1:3. Other ranges are possible. However, in some embodiments, the organic solvent may comprise exclusively of fluoroethylene carbonate (e.g., the organic solvent comprises only fluoroethylene carbonate). Other compositions of the organic solvent are possible.

Articles and methods described herein can include an electrode (e.g., a first electrode such as a cathode). In some embodiments, the electrode is a cathode. In some embodiments, the cathode can comprise a metal (e.g. a transition metal). In some embodiments, the metal of the cathode comprises Ni, Co, and/or Mn. The cathode may comprise metal oxides, such as $LiCoO_2$, $LiCo_xNi_{(1-x)}O_2$, $LiCo_xNi_yMn_{(1-x-y)}$ (e.g., $LiNi_{1/3}Mn_{1/3}Co_{1/3}O_2$), $LiMn_2O_4$, and combinations thereof. In some embodiments, an cathode active material within an electrode can comprise a lithium transition metal phosphates (e.g., $LiFePO_4$), which can, in some embodiments, be substituted with borates and/or silicates. A variety of other cathode active materials are suitable for use with cathodes of the electrochemical cells described herein, according to some embodiments. In some embodiments, the cathode active material comprises a lithium intercalation compound (e.g., a compound that is capable of reversibly inserting lithium ions at lattice sites and/or interstitial sites). In some cases, the cathode active material comprises a layered oxide. A layered oxide generally refers to an oxide having a lamellar structure (e.g., a plurality of sheets, or layers, stacked upon each other). Non-limiting examples of suitable layered oxides include lithium cobalt oxide ($LiCoO_2$), lithium nickel oxide ($LiNiO_2$), and lithium manganese oxide ($LiMnO_2$). In some embodiments, the layered oxide is lithium nickel manganese cobalt oxide ($LiNi_xMn_yCo_zO_2$, also referred to as "NMC" or "NCM"). In some such embodiments, the sum of x, y, and z is 1. For example, a non-limiting example of a suitable NMC compound is $LiNi_{1/3}Mn_{1/3}Co_{1/3}O_2$. In some embodiments, a layered oxide may have the formula $(Li_2MnO_3)_x(LiMO_2)_{(1-x)}$ where M is one or more of Ni, Mn, and Co. For example, the layered oxide may be $(Li_2MnO_3)_{0.25}(LiNi_{0.3}Co_{0.15}Mn_{0.55}O_2)_{0.75}$. In some embodiments, the layered oxide is lithium nickel cobalt aluminum oxide ($LiNi_xCo_yAl_zO_2$, also referred to as "NCA"). In some such embodiments, the sum of x, y, and z is 1. For example, a non-limiting example of a suitable NCA compound is $LiNi_{0.8}Co_{0.15}Al_{0.05}O_2$. In some embodiments, the cathode active material is a transition metal polyanion oxide (e.g., a compound comprising a transition metal, an oxygen, and/or an anion having a charge with an absolute value greater than 1). A non-limiting example of a suitable transition metal polyanion oxide is lithium iron phosphate ($LiFePO_4$, also referred to as "LFP"). Another non-limiting example of a suitable transition metal polyanion oxide is lithium manganese iron phosphate ($LiMn_xFe_{1-x}PO_4$, also referred to as "LMFP"). A non-limiting example of a suitable LMFP compound is $LiMn_{0.8}Fe_{0.2}PO_4$. In some embodiments, the cathode active material is a spinel (e.g., a compound having the structure $AB_2O_4$, where A can be Li, Mg, Fe, Mn, Zn, Cu, Ni, Ti, or Si, and B can be Al, Fe, Cr, Mn, or V). A non-limiting example of a suitable spinel is a lithium manganese oxide with the chemical formula $LiM_xMn_{2-x}O_4$ where M is one or more of Co, Mg, Cr, Ni, Fe, Ti, and Zn. In some embodiments, x may equal 0 and the spinel may be lithium manganese oxide ($LiMn_2O_4$, also referred to as "LMO"). Another non-limiting example is lithium manganese nickel oxide ($LiNi_xM_{2-x}O_4$, also referred to as "LMNO"). A non-limiting example of a suitable LMNO compound is $LiNi_{0.5}Mn_{1.5}O_4$. In some cases, the electroactive material of the second electrode comprises $Li_{1.14}Mn_{0.42}Ni_{0.25}Co_{0.29}O_2$ ("HC-MNC"), lithium carbonate ($Li_2CO_3$), lithium carbides (e.g., $Li_2C_2$, $Li_4C$, $Li_6C_2$, $Li_8C_3$, $Li_6C_3$, $Li_4C_3$, $Li_4C_5$), vanadium oxides (e.g., $V_2O_5$, $V_2O_3$, $V_6O_{13}$), and/or vanadium phosphates (e.g., lithium vanadium phosphates, such as $Li_3V_2(PO_4)_3$), or any combination thereof.

In some embodiments, the cathode active material comprises a conversion compound. For instance, the cathode may be a lithium conversion cathode. It has been recognized that a cathode comprising a conversion compound may have a relatively large specific capacity. Without wishing to be bound by a particular theory, a relatively large specific capacity may be achieved by utilizing all possible oxidation states of a compound through a conversion reaction in which more than one electron transfer takes place per transition metal (e.g., compared to 0.1-1 electron transfer in intercalation compounds). Suitable conversion compounds include, but are not limited to, transition metal oxides (e.g., $Co_3O_4$), transition metal hydrides, transition metal sulfides, transition metal nitrides, and transition metal fluorides (e.g., $CuF_2$, $FeF_2$, $FeF_3$). A transition metal generally refers to an element whose atom has a partially filled d sub-shell (e.g., Sc, Ti, V, Cr, Mn, Fe, Co, Ni, Cu, Zn, Y, Zr, Nb, Mo, Tc, Ru, Rh, Pd, Ag, Cd, Hf, Ta, W, Re, Os, Ir, Pt, Au, Hg, Rf, Db, Sg, Bh, Hs).

In some cases, the cathode active material may be doped with one or more dopants to alter the electrical properties (e.g., electrical conductivity) of the cathode active material. Non-limiting examples of suitable dopants include aluminum, niobium, silver, and zirconium.

In some embodiments, the cathode active material may be modified by a surface coating comprising an oxide. Non-limiting examples of surface oxide coating materials include: $MgO$, $Al_2O_3$, $SiO_2$, $TiO_2$, $ZnO_2$, $SnO_2$, and $ZrO_2$. In some embodiments, such coatings may prevent direct contact between the cathode active material and the electrolyte, thereby suppressing side reactions.

In some embodiments, the electrode is an anode (e.g., a second electrode such as an node). For example, in some embodiments, the anode comprises lithium, such as lithium metal and/or a lithium alloy. Examples of lithium include, but are not limited to, lithium metal (such as lithium foil and/or lithium deposited onto a conductive substrate), lithium metal alloys (e.g., lithium-aluminum alloys and lithium-tin alloys), and vacuum-deposited lithium metal. In some cases, the lithium metal/lithium metal alloy may be present during only a portion of charge/discharge cycles. For example, the cell can be constructed without any lithium metal/lithium metal alloy on an anode current collector, and the lithium metal/lithium metal alloy may subsequently be deposited on the anode current collecting during a charging step.

A variety of anode active materials may be suitable for use with the anodes of the electrochemical cells described herein. As described above, in some embodiments, the anode active material comprises lithium (e.g., lithium metal), such as lithium foil, lithium deposited onto a conductive substrate or onto a non-conductive substrate, and lithium alloys (e.g., lithium-aluminum alloys and lithium-tin alloys). Lithium can be contained as one film or as several films, optionally separated. Suitable lithium alloys for use in the aspects described herein can include alloys of lithium and aluminum, magnesium, silicium (silicon), indium, and/or tin. In some embodiments, the anode active material comprises lithium (e.g., lithium metal and/or a lithium metal alloy) during at least a portion of a charge/discharge cycle of the electrochemical cell.

In some embodiments, the anode active material contains greater than or equal to 50 wt % lithium. In some cases, the anode active material contains greater than or equal to 75 wt %, greater than or equal to 90 wt %, greater than or equal to 95 wt %, or greater than or equal to 99 wt % lithium. In some embodiments, the anode active material contains less than or equal to 99 wt %, less than or equal to 95 wt %, less than or equal to 90 wt %, less than or equal to 75 wt %, or less than or equal to 50 wt % lithium. Combinations of the above-referenced ranges are also possible (e.g., greater than or equal to 50 wt % lithium and less than or equal to 99 wt % lithium). Other ranges are possible.

In some embodiments, the anode is an electrode from which lithium ions are liberated during discharge and into which the lithium ions are integrated (e.g., intercalated) during charge. In some embodiments, the anode active material is a lithium intercalation compound (e.g., a compound that is capable of reversibly inserting lithium ions at lattice sites and/or interstitial sites). In some embodiments, the anode active material comprises carbon. In some cases, the anode active material is or comprises a graphitic material (e.g., graphite). A graphitic material generally refers to a material that comprises a plurality of layers of graphene (i.e., layers comprising carbon atoms covalently bonded in a hexagonal lattice). Adjacent graphene layers are typically attracted to each other via van der Waals forces, although covalent bonds may be present between one or more sheets in some cases. In some cases, the carbon-comprising anode active material is or comprises coke (e.g., petroleum coke). In some embodiments, the anode active material comprises silicon, lithium, and/or any alloys of combinations thereof. In some embodiments, the anode active material comprises lithium titanate ($Li_4Ti_5O_{12}$, also referred to as "LTO"), tin-cobalt oxide, or any combinations thereof.

In some embodiments, an electrode, such as an anode, can comprise other electroactive materials including, but are not limited to, other alkali metals (e.g., sodium, potassium, rubidium, cesium, francium), alkaline earth metals (e.g., beryllium, magnesium, calcium, strontium, barium, radium), transition metals (e.g., scandium, titanium, vanadium, chromium, manganese, iron, cobalt, nickel, copper, yttrium, zirconium, niobium, molybdenum, ruthenium, rhodium, palladium, silver, hafnium, tantalum, tungsten, rhenium, osmium, iridium, platinum, gold) and the like.

In some embodiments, an optional layer may be positioned proximate an electrode. One example of an optional layer is optional layer 260 in FIGS. 2A-2D. In some embodiments, the optional layer may be positioned between the first electrode and the second electrode. In some embodiments, the optional layer is positioned between the first electrode and the electrolyte. In some embodiments, the optional layer comprises a polymer layer and/or a release layer. Additionally or alternatively, in some embodiments, the optional layer may be a polymer layer (e.g., a separator) that is conductive to the plurality of conductive ions. Suitable polymers include, but are not limited to, both electrically conducting and electrically insulating ion conduction polymers. Possible electrically conducting polymers include, but are not limited to, poly(acetylene)s, poly(pyrrole)s, poly(thiophene)s, poly(aniline)s, poly(fluorene)s, polynaphthalenes, poly(p-phenylene sulfide), and poly(para-phenylene vinylene)s. Possible electrically insulating polymers include, but are not limited to, acrylate, polyethyleneoxide, silicones, and polyvinylchlorides. Polymers described herein for release layers can also be used as the optional layer. In some such embodiments, the polymer(s) is present in a non-swollen state (e.g., as a thin film), such as in configurations in which the optional layer comprising the polymer is separated from the electrolyte by a ceramic, glass or glassy-ceramic layer. The above polymers may be doped with ion conducting salts to provide, or enhance, the desired ion conducting properties. Appropriate salts for lithium based cells include, for example, LiSCN, LiBr, LiI, $LiClO_4$, $LiAsF_6$, $LiSO_3CF_3$, $LiSO_3CH_3$, $LiBF_4$, $LiB(Ph)_4$, $LiPF_6$, $LiC(SO_2CF_3)_3$, and $LiN(SO_2CF_3)_2$ though other salts may be used for other chemistries. The above materials may be deposited using spin casting, doctor blading, flash evaporation, or any other appropriate deposition technique. In some embodiments, an optional layer is formed of, or includes, a suitable polymeric material listed herein for the release layer, optionally with modified molecular weight, cross-linking density, and/or addition of additives or other components. In embodiments in which more than one optional layer is present, each optional layer may each independently comprise one or more of the above-referenced materials.

As described herein, in some embodiments, a coating is formed on an electrode. Forming the coating can include exposing an electrode to a solution, the solution comprising a silylated sulfonic acid ester. For example, SSAEs described above and elsewhere herein can be used during the exposing step. In some cases, the electrode coating may form spontaneously when exposed to the electrolyte solution containing the SSAE. However, in some cases, intermediate processes may occur in forming the coating. For example, some embodiments comprise applying a first voltage to the electrode. Application of a voltage to the electrode may facilitate or cause the coating (or reaction product) to form adjacent (e.g., directly adjacent) to the electrode. In some embodiments, a second voltage is applied to the electrode, and the second may facilitate or cause the coating (or reaction product) to form adjacent (e.g., directly adjacent) to the electrode. The second voltage may be of an opposite sign of the first voltage. That is to say, in some embodiments, a positive voltage can be applied to the first electrode, while a negative voltage is applied to the second electrode. However, application of a voltage of the same sign is also possible.

The embodiments described herein may be used in association with any suitable type of electrochemical cell, such as a lithium ion battery. In some embodiments, the electrochemical cell is a primary (non-rechargeable) battery. In other embodiments, the electrochemical cell may be a secondary (rechargeable) battery. Some embodiments relate to lithium rechargeable batteries. In some cases, the electrochemical cell comprises a lithium-sulfur rechargeable battery. However, wherever lithium batteries are described herein, it is to be understood that any analogous alkali metal battery can be used. Additionally, although embodiments of the invention are particularly useful for protection of a lithium anode or a transition metal cathode, the embodiments described herein may be applicable to other applications in which electrode protection is desired.

In some embodiments, it can be advantageous to apply an anisotropic force to the electrochemical cells described herein during charge and/or discharge. The electrochemical cell may include an electrolyte comprising one or more SSAEs as described above. In some embodiments, the electrochemical cells and/or the electrodes described herein can be configured to withstand an applied anisotropic force (e.g., a force applied to enhance the morphology of an electrode within the cell) while maintaining their structural integrity. The electrodes described herein may be a part of an electrochemical cell that is adapted and arranged such that, during at least one period of time during charge and/or discharge of the cell, an anisotropic force with a component normal to the active surface of an electrode within the electrochemical cell (e.g., an anode comprising lithium metal and/or a lithium alloy) is applied to the cell. In one set of embodiments, the applied anisotropic force can be selected to enhance the morphology of an electrode (e.g., an anode such as a lithium metal and/or a lithium alloy anode). As understood in the art, an "anisotropic force" is a force that is not equal in all directions.

In some such cases, the anisotropic force comprises a component normal to an active surface of an electrode (e.g., a first electrode such as a cathode, a second electrode such as an anode) within an electrochemical cell. As used herein, the term "active surface" is used to describe a surface of an electrode at which electrochemical reactions may take place. A force with a "component normal" to a surface is given its ordinary meaning as would be understood by those of ordinary skill in the art and includes, for example, a force which at least in part exerts itself in a direction substantially perpendicular to the surface. For example, in the case of a horizontal table with an object resting on the table and affected only by gravity, the object exerts a force essentially completely normal to the surface of the table. If the object is also urged laterally across the horizontal table surface, then it exerts a force on the table which, while not completely perpendicular to the horizontal surface, includes a component normal to the table surface. Those of ordinary skill will understand other examples of these terms, especially as applied within the description of this document. In the case of a curved surface (for example, a concave surface or a convex surface), the component of the anisotropic force that is normal to an active surface of an electrode may correspond to the component normal to a plane that is tangent to the curved surface at the point at which the anisotropic force is applied. The anisotropic force may be applied, in some cases, at one or more pre-determined locations, optionally distributed over the active surface of the anode. In some embodiments, the anisotropic force is applied uniformly over the active surface of the first electrode (e.g., a cathode) and/or the second electrode (e.g., an anode).

Any of the electrochemical cell properties and/or performance metrics described herein may be achieved, alone or in combination with each other, while an anisotropic force is applied to the electrochemical cell (e.g., during charge and/or discharge of the cell) during charge and/or discharge. In some embodiments, the anisotropic force applied to the electrode, to the electrochemical cell (e.g., during at least one period of time during charge and/or discharge of the cell) can include a component normal to an active surface of an electrode (e.g., an anode such as a lithium metal and/or lithium alloy anode within the electrochemical cell). In some embodiments, the component of the anisotropic force that is normal to the active surface of the electrode defines a pressure of greater than or equal to 1 $kg/cm^2$, greater than or equal to 2 $kg/cm^2$, greater than or equal to 4 $kg/cm^2$, greater than or equal to 6 $kg/cm^2$, greater than or equal to 8 $kg/cm^2$, greater than or equal to 10 $kg/cm^2$, greater than or equal to 12 $kg/cm^2$, greater than or equal to 14 $kg/cm^2$, greater than or equal to 16 $kg/cm^2$, greater than or equal to 18 $kg/cm^2$, greater than or equal to 20 $kg/cm^2$, greater than or equal to 22 $kg/cm^2$, greater than or equal to 24 $kg/cm^2$, greater than or equal to 26 $kg/cm^2$, greater than or equal to 28 $kg/cm^2$, greater than or equal to 30 $kg/cm^2$, greater than or equal to 32 $kg/cm^2$, greater than or equal to 34 $kg/cm^2$, greater than or equal to 36 $kg/cm^2$, greater than or equal to 38 $kg/cm^2$, greater than or equal to 40 $kg/cm^2$, greater than or equal to 42 $kg/cm^2$, greater than or equal to 44 $kg/cm^2$, greater than or equal to 46 $kg/cm^2$, or greater than or equal to 48 $kg/cm^2$. In some embodiments, the component of the anisotropic force normal to the active surface may, for example, define a pressure of less than or equal to 50 $kg/cm^2$, less than or equal to 48 $kg/cm^2$, less than or equal to 46 $kg/cm^2$, less than or equal to 44 $kg/cm^2$, less than or equal to 42 $kg/cm^2$, less than or equal to 40 $kg/cm^2$, less than or equal to 38 $kg/cm^2$, less than or equal to 36 $kg/cm^2$, less than or equal to 34 $kg/cm^2$, less than or equal to 32 $kg/cm^2$, less than or equal to 30 $kg/cm^2$, less than or equal to 28 $kg/cm^2$, less than or equal to 26 $kg/cm^2$, less than or equal to 24 $kg/cm^2$, less than or equal to 22 $kg/cm^2$, less than or equal to 20 $kg/cm^2$, less than or equal to 18 $kg/cm^2$, less about 16 $kg/cm^2$, less than or equal to 14 $kg/cm^2$, less than or equal to 12 $kg/cm^2$, less than or equal to 10 $kg/cm^2$, less than or equal to 8 $kg/cm^2$, less than or equal to 6 $kg/cm^2$, less than or equal to 4 $kg/cm^2$, or less than or equal to 2 $kg/cm^2$. Combinations of the above-referenced ranges are also possible (e.g., greater than or equal to 1 kg/cm$^2$ and less than or equal to 50 kg/cm$^2$). Other ranges are possible.

The anisotropic forces applied during charge and/or discharge as described herein may be applied using any method known in the art. In some embodiments, the force may be applied using compression springs. Forces may be applied using other elements (either inside or outside a containment structure) including, but not limited to Belleville washers, machine screws, pneumatic devices, and/or weights, among others. In some cases, cells may be pre-compressed before they are inserted into containment structures, and, upon being inserted to the containment structure, they may expand to produce a net force on the cell. Suitable methods for applying such forces are described in detail, for example, in U.S. Pat. No. 9,105,938, which is incorporated herein by reference in its entirety.

In some embodiments, the electrode (e.g., comprising the species and/or a reaction product thereof) can be part of an electrochemical cell (e.g., a rechargeable electrochemical cell). In some embodiments, the electrode (e.g., comprising the species and/or a reaction product thereof) can be part of an electrochemical cell that is integrated into a battery (e.g., a rechargeable battery). In some embodiments, an electrochemical cell disclosed herein is integrated into a battery (e.g., a rechargeable battery).

In some embodiments, the electrochemical cells and/or rechargeable batteries described herein can be used to provide power to an electric vehicle or otherwise be incorporated into an electric vehicle. As a non-limiting example, electrochemical cells and/or rechargeable batteries described herein can, in some embodiments, be used to provide power to a drive train of an electric vehicle. The vehicle may be any suitable vehicle, adapted for travel on land, sea, and/or air. For example, the vehicle may be an automobile, truck, motorcycle, boat, helicopter, airplane, and/or any other suitable type of vehicle.

The following examples are intended to illustrate certain embodiments of the present invention, but do not exemplify the full scope of the invention.

Example 1

The following example describes the preparation of two electrochemical cells: one cell comprising a silylated sulfonic acid ester (bis-trimethylsilylsulfate) in the electrolyte and one cell absent the silylated sulfonic acid ester. In this example, the number of cycles to 80% battery capacity was measured to demonstrate improved capacity with the inclusion of a silylated sulfonic acid ester, as described herein.

Preparation of Electrochemical Cell and Charge/Discharge Cycling of Electrochemical Cell with Silylated Sulfonic Acid Ester (bis-trimethylsilylsulfate) in the Electrolyte The electrochemical cell was prepared by the following method: the first electrode (anode) was vacuum deposited Li (thickness 15 m) on a 200 nm-thick Cu current collector, disposed on a polyethylene terephthalate (PET) substrate. The porous separator was a 9 μm-thick polyolefin film (Entek), and the second electrode (cathode) was nickel manganese cobalt (NCM811) coated on a 20 μm-thick aluminum substrate current collector with an active cathode material (ACM) loading of approximately 20.62 mg/cm$^2$ on each side of the current collector. The above components were assembled in a stacked layered structure of anode/separator/cathode/separator/anode/separator/cathode/separator/anode/separator/cathode/separator/anode. The total active cathode surface area was 100 cm$^2$.

After sealing the cell components in a foil pouch, appropriate amount of electrolyte was added (e.g., 0.55 mL). The cell package was then vacuum sealed. These cells were allowed to soak in the electrolyte for 24 hours unrestrained. The above cell was prepared with an electrolyte containing 1 M lithium hexafluorophosphate (LiPF$_6$) in a 80 wt %:20 wt % mixture of dimethyl carbonate (DMC) and fluoroethylene carbonate (FEC) (BASF LP9) plus 2 wt % of bis-trimethylsilylsulfate and 1 wt % of lithium bis(oxalate)borate (LiBOB). After the cells were soaked in the electrolyte, 10 kg/cm$^2$ pressure was applied and the cells were cycled under this pressure. Charge and discharge cycling was performed under the following condition: C/10 (30 mA) charge to 4.4 V, followed by taper at 4.4 V to 3 mA; C/2.5 (120 mA) discharge to 3.2V. Number of cycles to 80% of initial capacity was 320.

Preparation of Electrochemical Cell and Charge/Discharge Cycling of Electrochemical Cell with No Silylated Sulfonic Acid Ester in the Electrolyte The electrochemical cells were prepared by the following methods: the first electrode (anode) was vacuum deposited Li (thickness 15 μm) on a 200 nm-thick Cu as current collector disposed on a polyethylene terephthalate (PET) substrate. The porous separator was a 9 μm-thick polyolefin film (Entek), and the second electrode (cathode) was nickel manganese cobalt (NCM811) coated on a 20 μm-thick aluminum substrate current collector with an active cathode material (ACM) loading of approximately 20.62 mg/cm$^2$ on each side of the current collector. The above components were assembled in a stacked layered structure of anode/separator/cathode/separator/anode/separator/cathode/separator/anode/separator/cathode/separator/anode. The total active cathode surface area was 100 cm$^2$.

After sealing the cell components in a foil pouch, appropriate amount of electrolyte was added (e.g., 0.55 mL). The cell package was then vacuum sealed. These cells were allowed to soak in the electrolyte for 24 hours unrestrained. The above cell was prepared with an electrolyte containing 1 M lithium hexafluorophosphate (LiPF$_6$) in a 80 wt %:20 wt % mixture of dimethyl carbonate (DMC) and fluoroethylene carbonate (FEC) (BASF LP9) plus 1 wt % of lithium bis(oxalate)borate (LiBOB). After the cells were soaked in the electrolyte, 10 kg/cm$^2$ pressure was applied and the cells were cycled under this pressure. Charge and discharge cycling was performed under the following condition: C/10 (30 mA) charge to 4.4 V, followed by taper at 4.4 V to 3 mA; C/2.5 (120 mA) discharge to 3.2 V. Number of cycles to 80% of initial capacity was 214.

Example 2

The following example describes the preparation of two electrochemical cells: one cell with a silylated sulfonic acid ester (bis-trimethylsilylsulfate) in the electrolyte and one cell absent the silylated sulfonic acid ester. In this example, the volume of gaseous products (e.g., by-products) is measured using Archimedes method to demonstrate reduction of gaseous by-product formation with the inclusion of the silylated sulfonic acid ester, as described herein.

Preparation of Electrochemical Cell and Volumetric Gas by-Product Determination of Electrochemical Cell with a Silylated Sulfonic Acid Ester (Bis-Trimethylsilylsulfate) in the Electrolyte The electrochemical cells were prepared by the following methods: the first electrode (anode) was vacuum deposited Li (thickness 15 μm) on a 200 nm-thick Cu as current collector disposed on a polyethylene terephthalate (PET)

substrate. The porous separator was a 9 μm-thick polyolefin film (Entek), and the second electrode (cathode) was nickel manganese cobalt (NCM811) coated on a 20 μm-thick aluminum substrate current collector with an active cathode material (ACM) loading of approximately 20.62 mg/cm$^2$ on each side of the current collector. The above components were assembled in a stacked layered structure of anode/separator/cathode/separator/anode/separator/cathode/separator/anode/separator/cathode/separator/anode. The total active cathode surface area was 100 cm$^2$.

After sealing the cell components in a foil pouch, appropriate amount of electrolyte was added (e.g., 0.55 mL). The cell package was then vacuum sealed. These cells were allowed to soak in the electrolyte for 24 hours unrestrained. The above cell was prepared with an electrolyte containing 1 M lithium hexafluorophosphate (LiPF$_6$) in a 80 wt %:20 wt % mixture of dimethyl carbonate (DMC) and fluoroethylene carbonate (FEC) (BASF LP9) plus 2 wt % of bis-trimethylsilylsulfate and 1 wt % of lithium bis(oxalate)borate (LiBOB). After the cells were soaked in the electrolyte, 10 kg/cm$^2$ pressure was applied and the cells were cycled under this pressure. Charge and discharge cycling was performed under the following condition: C/10 (30 mA) charge to 4.4 V, followed by taper at 4.4 V to 3 mA; C/2.5 (120 mA) discharge to 3.2 V. After 4$^{th}$ charge cell was placed into a hot oven (60° C.) for 48 h (charge stand). The volume of gaseous products formed during charge stand was 2.5 mL.

Preparation of Electrochemical Cell and Volumetric Gas by-Product Determination of Electrochemical Cell with No Silylated Sulfonic Acid Ester in the Electrolyte The electrochemical cells were prepared by the following methods: the first electrode (anode) was vacuum deposited Li (thickness 15 m) on a 200 nm-thick Cu as current collector disposed on a polyethylene terephthalate (PET) substrate. The porous separator was a 9 μm-thick polyolefin film (Entek), and the second electrode (cathode) was nickel manganese cobalt (NCM811) coated on a 20 μm-thick aluminum substrate current collector with an active cathode material (ACM) loading of approximately 20.62 mg/cm$^2$ on each side of the current collector. The above components were assembled in a stacked layered structure of anode/separator/cathode/separator/anode/separator/cathode/separator/anode/separator/cathode/separator/anode. The total active cathode surface area was 100 cm$^2$.

After sealing the cell components in a foil pouch, appropriate amount of electrolyte was added (e.g., 0.55 mL). The cell package was then vacuum sealed. These cells were allowed to soak in the electrolyte for 24 hours unrestrained. The above cell was prepared with an electrolyte containing 1 M lithium hexafluorophosphate (LiPF$_6$) in a 80 wt %:20 wt % mixture of dimethyl carbonate (DMC) and fluoroethylene carbonate (FEC) (BASF LP9) plus 1 wt % of lithium bis(oxalate)borate (LiBOB). After the cells were soaked in the electrolyte, 10 kg/cm$^2$ pressure was applied, and the cells were cycled under this pressure. Charge and discharge cycling was performed under the following condition: C/10 (30 mA) charge to 4.4 V, followed by taper at 4.4 V to 3 mA; C/2.5 (120 mA) discharge to 3.2 V. After 4$^{th}$ charge cell was placed into a hot oven (60° C.) for 48 h (charge stand). The volume of gaseous products formed during charge stand was 3.3 mL.

Example 3

The following example describes the preparation of two electrochemical cells: one cell with a silylated sulfonic acid ester (bis-trimethylsilylsulfate) in the electrolyte and one cell absent the silylated sulfonic acid ester. In this example, the volume of gaseous products (e.g., gaseous by-products) is measured using Archimedes method to demonstrate reduction of gaseous by-product formation with the silylated sulfonic acid ester, as described herein.

Preparation or Electrochemical Cell and Volumetric Gas by-Product Determination of Electrochemical Cell with Silylated Sulfonic Acid Ester (Bis-Trimethylsilylsulfate) in the Electrolyte The electrochemical cells were prepared by the following methods: the first electrode (anode) was vacuum deposited Li (thickness 19 m) on a 200 nm-thick Cu as current collector disposed on a polyethylene terephthalate (PET) substrate. The porous separator was a 9 μm-thick polyolefin film (Entek), and the second electrode (cathode) was nickel manganese cobalt (NCM721) coated on a 20 μm-thick aluminum substrate current collector with an active cathode material (ACM) loading of approximately 20.57 mg/cm$^2$ on each side of the current collector. The above components were assembled in a stacked layered structure of anode/separator/cathode/separator/anode/separator/cathode/separator/anode/separator/cathode/separator/anode. The total active cathode surface area was 100 cm$^2$.

After sealing the cell components in a foil pouch, appropriate amount of electrolyte was added (e.g., 0.5 mL). The cell package was then vacuum sealed. These cells were allowed to soak in the electrolyte for 24 hours unrestrained. The above cell was prepared with an electrolyte containing 1 M lithium hexafluorophosphate (LiPF$_6$) in an 80 wt %:20 wt % mixture of dimethyl carbonate (DMC) and fluoroethylene carbonate (FEC) (BASF LP9) plus 1 wt %. of lithium bis(oxalate)borate (LiBOB) and 4 wt % of bis-trimethylsilylsulfate. After the cells were soaked in the electrolyte, 10 kg/cm$^2$ pressure was applied and the cells were cycled under this pressure. Charge and discharge cycling was performed under the following condition: C/10 (30 mA) charge to 4.4 V, followed by taper at 4.4 V to 3 mA; C/2.5 (120 mA) discharge to 3.2 V. After 425$^{th}$ charge cell was placed into a hot oven (60° C.) for 48 h (charge stand). The volume of gaseous products formed during charge stand was 2.9 mL.

Preparation and Volumetric Gas by-Product Determination of Electrochemical Cell without a Silylated Sulfonic Acid Ester in the Electrolyte The electrochemical cells were prepared by the following methods: the first electrode (anode) was vacuum deposited Li (thickness 19 m) on a 200 nm-thick Cu as current collector disposed on a polyethylene terephthalate (PET) substrate. The porous separator was a 9 μm-thick polyolefin film (Entek), and the second electrode (cathode) was nickel manganese cobalt (NCM721) coated on a 20 μm-thick aluminum substrate current collector with an active cathode material (ACM) loading of approximately 20.57 mg/cm$^2$ on each side of the current collector. The above components were assembled in a stacked layered structure of anode/separator/cathode/separator/anode/separator/cathode/separator/anode/separator/cathode/separator/anode. The total active cathode surface area was 100 cm$^2$.

After sealing the cell components in a foil pouch, appropriate amount of electrolyte was added (e.g., 0.5 mL). The cell package was then vacuum sealed. These cells were allowed to soak in the electrolyte for 24 hours unrestrained. The above cell was prepared with an electrolyte containing 1 M lithium hexafluorophosphate (LiPF$_6$) in a 80 wt %:20 wt % mixture of dimethyl carbonate (DMC) and fluoroethylene carbonate (FEC) (BASF LP9) plus 1 wt %. of lithium bis(oxalate)borate (LiBOB). After the cells were soaked in the electrolyte, 10 kg/cm$^2$ pressure was applied and the cells were cycled under this pressure. Charge and discharge cycling was performed under the following condition: C/10 (30 mA) charge to 4.4 V, followed by taper at 4.4 V to 3 mA; C/2.5 (120 mA) discharge to 3.2 V. After 425th charge cell was placed into a hot oven (60° C.) for 48 h (charge stand). The volume of gaseous products formed during charge stand was 3.6 mL.

Example 4

The following example describes the preparation of two electrochemical cells: one cell with the bis-trimethylsilyl ester of methylenedisulfonic acid (i.e., bis(trimethylsilyl) methylenedisulfonate) in the electrolyte and one cell absent this silylated sulfonic acid ester. In this example, the volume of gaseous products (e.g., gaseous by-products) is measured using Archimedes method to demonstrate reduction of gaseous by-product formation with the silylated sulfonic acid ester, as described herein.

Preparation of Electrochemical Cell and Volumetric Gas by-Product Determination of Electrochemical Cell with a Silylated Sulfonic Acid Ester (Bis-Trimethylsilyl Ester of Methylenedisulfonic Acid) in the Electrolyte The electrochemical cells were prepared by the following methods: the first electrode (anode) was vacuum deposited Li (thickness 15 m) on a 200 nm-thick Cu as current collector disposed on a polyethylene terephthalate (PET) substrate. The porous separator was a 9 μm-thick polyolefin film (Entek), and the second electrode (cathode) was nickel manganese cobalt (NCM811) coated on a 20 μm-thick aluminum substrate current collector with an active cathode material (ACM) loading of approximately 20.62 mg/cm² on each side of the current collector. The above components were assembled in a stacked layered structure of anode/separator/cathode/separator/anode/separator/cathode/separator/anode/separator/cathode/separator/anode. The total active cathode surface area was 100 cm².

After sealing the cell components in a foil pouch, appropriate amount of electrolyte was added (e.g., 0.55 mL). The cell package was then vacuum sealed. These cells were allowed to soak in the electrolyte for 24 hours unrestrained. The above cell was prepared with an electrolyte containing 1 M lithium hexafluorophosphate (LiPF$_6$) in an 80 wt %:20 wt % mixture of dimethyl carbonate (DMC) and fluoroethylene carbonate (FEC) (BASF LP9) plus 1 wt % of bis-trimethylsilyl ester of methylenedisulfonic acid. After the cells were soaked in the electrolyte, 10 kg/cm² pressure was applied and the cells were cycled under this pressure. Charge and discharge cycling was performed under the following condition: C/10 (30 mA) charge to 4.4 V, followed by taper at 4.4 V to 3 mA; C/2.5 (120 mA) discharge to 3.2 V. After 4th charge cell was placed into a hot oven (60° C.) for 48 h (charge stand). The volume of gaseous products formed during charge stand was 4.3 mL.

Preparation of Electrochemical Cell and Volumetric Gas by-Product Determination of Electrochemical Cell without a Silylated Sulfonic Acid Ester in the Electrolyte The electrochemical cells were prepared by the following methods: the first electrode (anode) was vacuum deposited Li (thickness 15 m) on a 200 nm-thick Cu as current collector disposed on a polyethylene terephthalate (PET) substrate. The porous separator was a 9 μm-thick polyolefin film (Entek), and the second electrode (cathode) was nickel manganese cobalt (NCM811) coated on a 20 μm-thick aluminum substrate current collector with an active cathode material (ACM) loading of approximately 20.62 mg/cm² on each side of the current collector. The above components were assembled in a stacked layered structure of anode/separator/cathode/separator/anode/separator/cathode/separator/anode/separator/cathode/separator/anode. The total active cathode surface area was 100 cm².

After sealing the cell components in a foil pouch, appropriate amount of electrolyte was added (e.g., 0.55 mL). The cell package was then vacuum sealed. These cells were allowed to soak in the electrolyte for 24 hours unrestrained. The above cell was prepared with an electrolyte containing 1 M lithium hexafluorophosphate (LiPF$_6$) in a 80 wt %:20 wt % mixture of dimethyl carbonate (DMC) and fluoroethylene carbonate (FEC) (BASF LP9) plus 1 wt % of lithium bis(oxalate)borate (LiBOB). After the cells were soaked in the electrolyte, 10 kg/cm² pressure was applied and the cells were cycled under this pressure. Charge and discharge cycling was performed under the following condition: C/10 (30 mA) charge to 4.4 V, followed by taper at 4.4 V to 3 mA; C/2.5 (120 mA) discharge to 3.2 V. After 4th charge cell was placed into a hot oven (60° C.) for 48 h (charge stand). The volume of gaseous products formed during charge stand was 5.9 mL.

Example 5

The following example describes the synthesis of several SSAEs.

Synthesis of Bis-Trimethylsilylsulfate

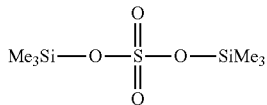 [SMILES: C[Si](C)(C)OS(=O)(=O)O[Si](C)(C)C]

To 24.5 g (0.250 mol) of sulfuric acid in 200 mL of benzene was added dropwise 66 mL (57 g, 0.525 mol) of trimethylsilyl chloride while stirring at 50° C. for 2 hours, then heated to 80° C. for 16 hours. Benzene was distilled out of the reaction mixture and the residue was distilled under vacuum. Yield of product was 86.5%, m.p. was 58-60° C. The structure of the product was confirmed with NMR ($^1$H, $^{13}$C, $^{29}$Si).

Synthesis of Methylenedisulfonic Acid Bis(Trimethylsilyl) Ester

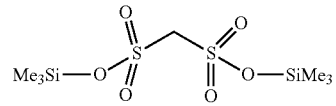

To 25 g (0.142 mol) of methylenedisulfonic acid in 200 mL anhydrous benzene was added 72 mL (61.7 g, 0.568 mol) trimethylsilyl chloride at 55° C. while stirring. After addition was complete, the reaction mixture was stirred at the same temperature for 16 hours. Benzene was distilled out of the reaction mixture and the residue was distilled under vacuum. Yield of the product was 54%, b.p. 70-80° C. at 0.4 mm Hg. The structure of the product was confirmed with NMR ($^1$H, $^{13}$C, $^{29}$Si).

Synthesis of p-Toluenesulfonic Acid Trimethylsilyl Ester

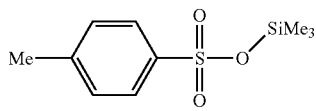 [SMILES: Cc1ccc(S(=O)(=O)O[Si](C)(C)C)cc1]

To 27.16 g (0.158 mol) of p-toluenesulfonic acid in 160 mL anhydrous benzene was added 22 mL (18.85 g, 0.173 mol) of trimethylsilyl chloride at 50° C. while stirring. After addition was complete, the reaction mixture was stirred at 30° C. for 16 hours. Benzene was distilled out of the reaction mixture and the residue was distilled under vacuum. Yield of the product was 71%, b.p. 80° C. at 0.4 mm Hg. The structure of the product was confirmed with NMR ($^1$H, $^{13}$C, $^{29}$Si).

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Some embodiments may be embodied as a method, of which various examples have been described. The acts performed as part of the methods may be ordered in any suitable way. Accordingly, embodiments may be constructed in which acts are performed in an order different than illustrated, which may include different (e.g., more or less) acts than those that are described, and/or that may involve performing some acts simultaneously, even though the acts are shown as being performed sequentially in the embodiments specifically described above.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An electrolyte, comprising:
a plurality of conductive ions;
at least one solvent; and
at least one silylated sulfonic acid ester, wherein the silylated sulfonic acid ester comprises the formula:

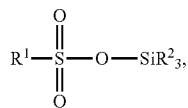

wherein $R^1$ and $R^2$ are each independently selected from substituted or unsubstituted nitroaryl; substituted or unsubstituted fused aryl; and substituted or unsubstituted perfluoroalkyl aryl.

2. The electrolyte claim 1, wherein the plurality of conductive ions comprises a lithium salt, optionally wherein the lithium salt comprises an alkali metal hexafluorophosphate salt, a triflate salt, a bis(trifluoromethyl)sulfonamide salt, and/or a bis(fluorosulfonyl)imide salt.

3. An article comprising the electrolyte of claim 1, wherein the article further comprises an electrode comprising a metal, optionally, wherein the metal comprises lithium metal.

4. The article of claim 3, wherein the metal comprises Ni, Co, Mn, Al, and/or Mg.

5. The article of claim 3, wherein the electrode is a cathode or an anode.

6. The article of claim 3, wherein the electrode is a lithium intercalation electrode or a lithium metal electrode.

7. The electrolyte of claim 1, wherein the electrolyte comprises bisfluoro(oxolato)borate and/or difluoro(oxalato)borate.

8. The electrolyte of claim 1, wherein the solvent comprises a carbonate-based solvent, optionally wherein the carbonate-based solvent comprises dimethyl carbonate and/or fluoroethylene carbonate.

9. The electrolyte of claim 1, wherein the silylated sulfonic acid ester comprises bis(trimethylsilyl) sulfate.

10. The electrolyte of claim 1, wherein the silylated sulfonic acid ester comprises a linked bisulfonate.

11. The electrolyte of claim 1, wherein the silylated sulfonic acid ester comprises an aromatic sulfonic acid ester.

12. The electrolyte of claim 1, wherein the silylated sulfonic acid ester comprises a cyclic sulfonic acid ester.

13. The electrolyte of claim 1, further comprising a silylated sulfonic acid ester having the formula:

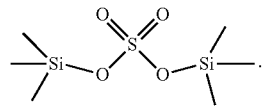

14. The electrolyte of claim 1, further comprising a silylated sulfonic acid ester comprising the formula:

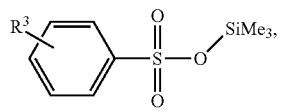

wherein $R^3$ is selected from hydrogen; substituted or unsubstituted, branched or unbranched aliphatic; substituted or unsubstituted cyclic; substituted or unsubstituted, branched or unbranched acyclic; substituted or unsubstituted, branched or unbranched heteroaliphatic; substituted or unsubstituted, branched or unbranched acyl; substituted or unsubstituted aryl; and substituted or unsubstituted heteroaryl.

15. An electrolyte, comprising:
a plurality of conductive ions;
at least one solvent; and
at least one silylated sulfonic acid ester, wherein the silylated sulfonic acid ester comprises the formula:

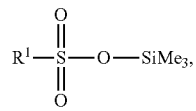

wherein $R^1$ is selected from substituted or unsubstituted nitroaryl; substituted or unsubstituted fused aryl; and substituted or unsubstituted perfluoroalkyl aryl.

* * * * *

UNITED STATES PATENT AND TRADEMARK OFFICE
CERTIFICATE OF CORRECTION

| | |
|---|---|
| PATENT NO. | : 12,107,238 B2 |
| APPLICATION NO. | : 17/479299 |
| DATED | : October 1, 2024 |
| INVENTOR(S) | : Igor P. Kovalev et al. |

It is certified that error appears in the above-identified patent and that said Letters Patent is hereby corrected as shown below:

In the Claims

In Claim 2, at Column 29, Line 18, "The electrolyte claim 1" should read --The electrolyte of claim 1--

Signed and Sealed this
Third Day of December, 2024

Katherine Kelly Vidal
*Director of the United States Patent and Trademark Office*